US011588926B2

(12) United States Patent
Shi

(10) Patent No.: US 11,588,926 B2
(45) Date of Patent: Feb. 21, 2023

(54) STATISTIC MULTIPLEXED COMPUTING SYSTEM FOR NETWORK-SCALE RELIABLE HIGH-PERFORMANCE SERVICES

(71) Applicant: Temple University—Of The Commonwealth System of Higher Education, Philadelphia, PA (US)

(72) Inventor: Justin Yuan Shi, Wayne, PA (US)

(73) Assignee: Temple University—Of The Commonwealth System of Higher Education, Philadelphia, PA (US)

( * ) Notice: Subject to any disclaimer, the term of this patent is extended or adjusted under 35 U.S.C. 154(b) by 370 days.

(21) Appl. No.: 16/348,899

(22) PCT Filed: Nov. 14, 2017

(86) PCT No.: PCT/US2017/061492
§ 371 (c)(1),
(2) Date: May 10, 2019

(87) PCT Pub. No.: WO2018/089987
PCT Pub. Date: May 17, 2018

(65) Prior Publication Data
US 2021/0297480 A1    Sep. 23, 2021

Related U.S. Application Data

(60) Provisional application No. 62/421,642, filed on Nov. 14, 2016.

(51) Int. Cl.
*H04L 69/40* (2022.01)
*H04L 69/14* (2022.01)

(52) U.S. Cl.
CPC .............. *H04L 69/40* (2013.01); *H04L 69/14* (2013.01)

(58) Field of Classification Search
CPC ..... H04L 67/10; H04L 67/1097; H04L 69/40; H04L 67/42; H04L 69/14
(Continued)

(56) References Cited

U.S. PATENT DOCUMENTS 7,069,320 B1    6/2006  Chang
8,504,718 B2    8/2013  Wang
(Continued)

FOREIGN PATENT DOCUMENTS

| JP | H11306153 A | 11/1999 |
|----|----|----|
| JP | 5504706 | 1/2011 |
| WO | 9614617 A1 | 5/1996 |

OTHER PUBLICATIONS

Supplementary European Search Report for App No. EP17869136.6, dated Jun. 9, 2020, 14 pages.
(Continued)

*Primary Examiner* — Johnny B Aguiar
(74) *Attorney, Agent, or Firm* — Riverside Law LLP

(57) ABSTRACT

A system for network-scale parallel computing comprises a set of computer-readable instructions implementing the steps of executing a computational process from at least one client node by communicating via a content addressable service network implemented using the Tuple Space abstraction, data parallel semantics and Unidirectional Virtual Ring architecture, with any number of service computers, networks and storage to deliver lossless, non-stop services. A network-scale distributed storage system, an enhanced Domain Name System (DNS) system, a network-scale database system and a network-scale hybrid transactional analytical processing systems are also described.

4 Claims, 18 Drawing Sheets

(58) Field of Classification Search
USPC ..................................... 709/223, 224, 226
See application file for complete search history.

(56) References Cited

U.S. PATENT DOCUMENTS

| | | | | |
|---|---|---|---|---|
| 8,572,290 | B1 | 10/2013 | Mukhopadhyay | |
| 9,015,126 | B2 | 4/2015 | Rambacher | |
| 9,628,438 | B2 | 4/2017 | Hardin | |
| 2002/0010665 | A1* | 1/2002 | Lefebvre | G06Q 40/123 705/31 |
| 2008/0013566 | A1 | 1/2008 | Smith | |
| 2008/0046400 | A1 | 2/2008 | Shi | |
| 2009/0019258 | A1* | 1/2009 | Shi | G06F 11/2035 712/29 |
| 2012/0303998 | A1* | 11/2012 | Sun | G06F 11/2041 714/4.11 |
| 2013/0036323 | A1* | 2/2013 | Goose | G06F 11/1484 714/4.11 |
| 2013/0273962 | A1* | 10/2013 | Phillips | G08B 27/008 455/521 |
| 2016/0154714 | A1* | 6/2016 | Lightner | G06F 11/2023 714/4.11 |
| 2016/0239350 | A1* | 8/2016 | Kamawat | G06F 9/5088 |
| 2017/0249215 | A1* | 8/2017 | Gandhi | G06F 11/1425 |

OTHER PUBLICATIONS

Baran, P, "Reliable Digital Communications Systems Using Unreliable Network Repeater Nodes", the RAND Corporation, May 27, 1960.
Spinelli, J, "Self-Stabilizing Sliding Window ARQ Protocols", IEEE/ACM Transactions on Networking, 5(2) Apr. 1997.
Stoica, et al., "Chord: A Scalable Peer-to-Peer Lookup Service for Internet Applications", ACM SIGCOMM Computer Communication Review, Dec. 2001.
Pradeep, A, "P2PHDFS: An Implementation of Statistic Multiplexed Computing Architecture in Hadoop File System", Thesis submitted to TU Graduate Board, Jan. 2013.
Shi, J, "Statistic Multiplexed Computing (SMC)—The Neglected Path to Unlimited Application Scalability", Software Engineering Assembly, NCAR—Boulder, CO, Apr. 2013.
Shi, J, "Statistic Multiplexed Computing (SMC)—A Blueprint of Exascale Computing", SC13 Exhibitor Forum, Boulder, CO, Nov. 2013.
Shi, J, "Symposium: CAP-Plus for Big Data", BigDataScience 2014—Aug. 2014.
Shi, J, "Exhibit: Experiences for Extreme Scale Computing", SC14, New Orleans, LA—2014.
Celik, et al., "AnkaCom: A Development and Experiment for Extreme Scale Computing", 2015 IEEE International Conference on Computer and Information Technology, Oct. 2015.

* cited by examiner

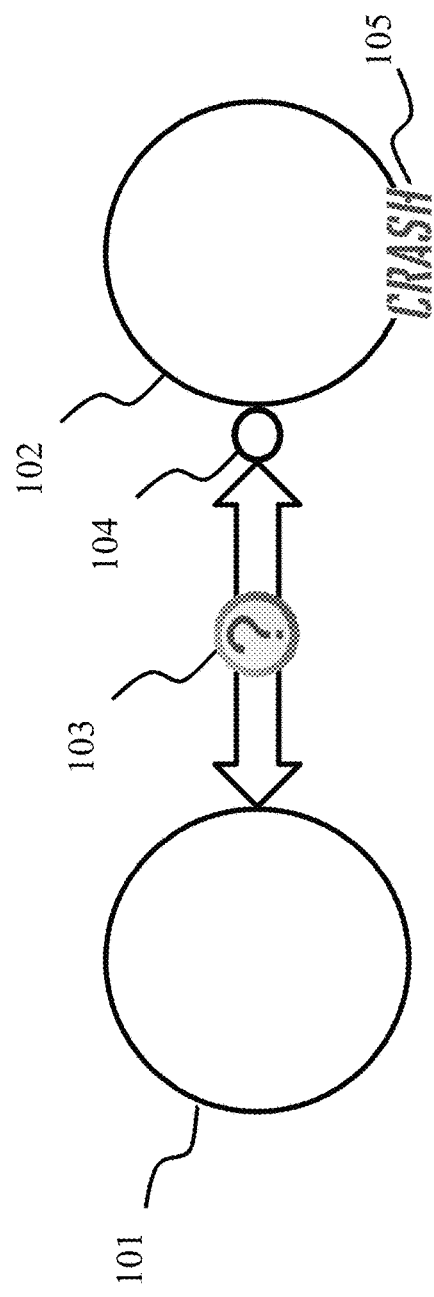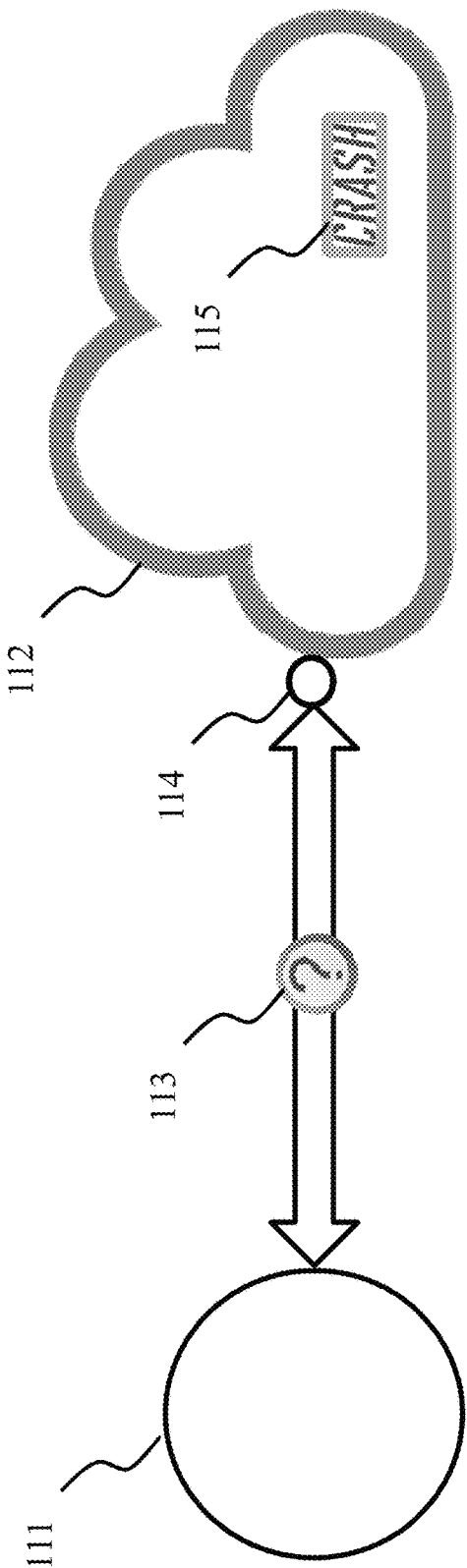
Fig. 1A
Fig. 1B

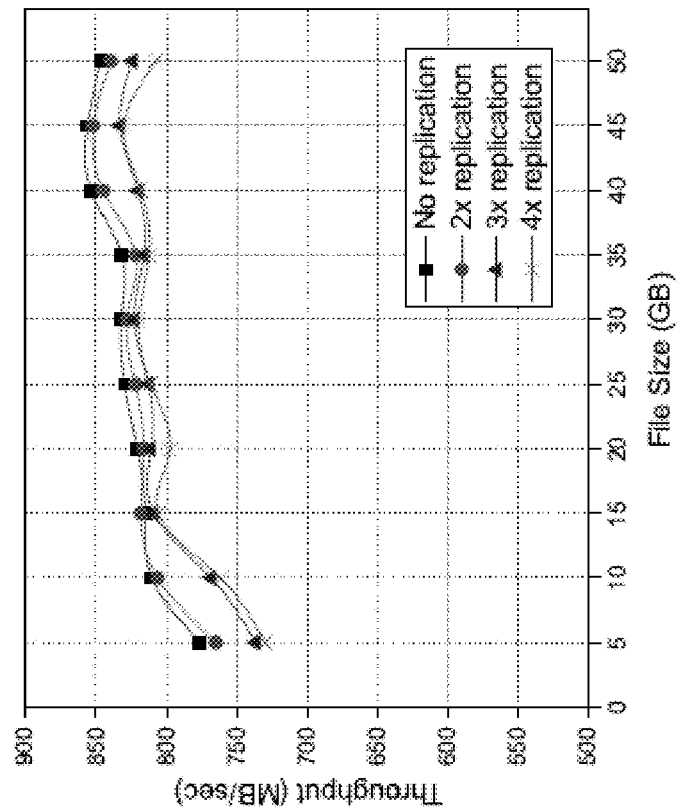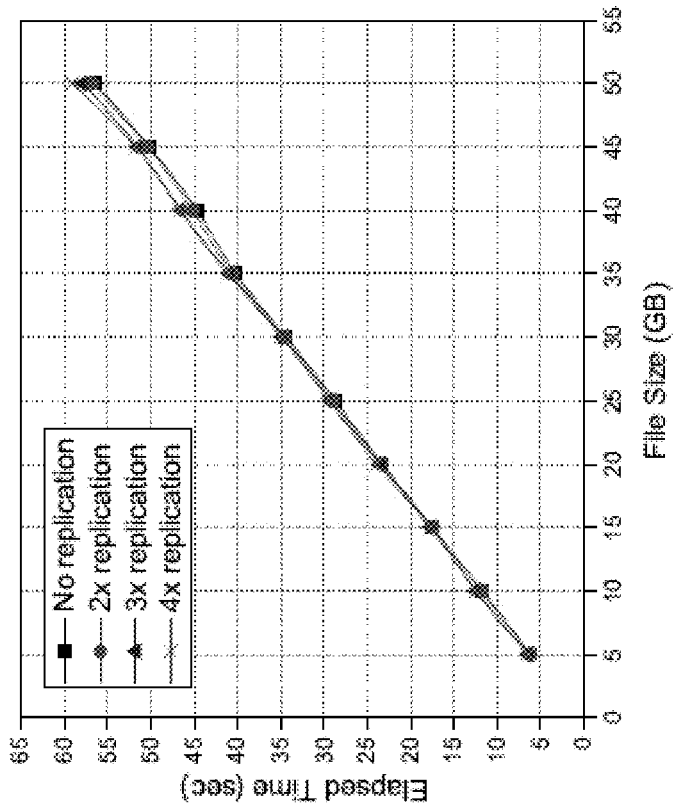
Fig. 13

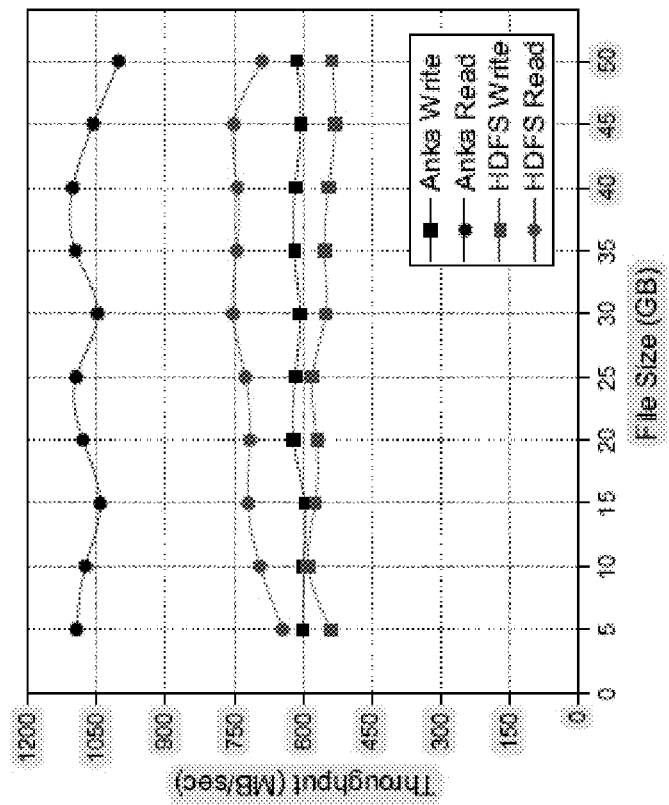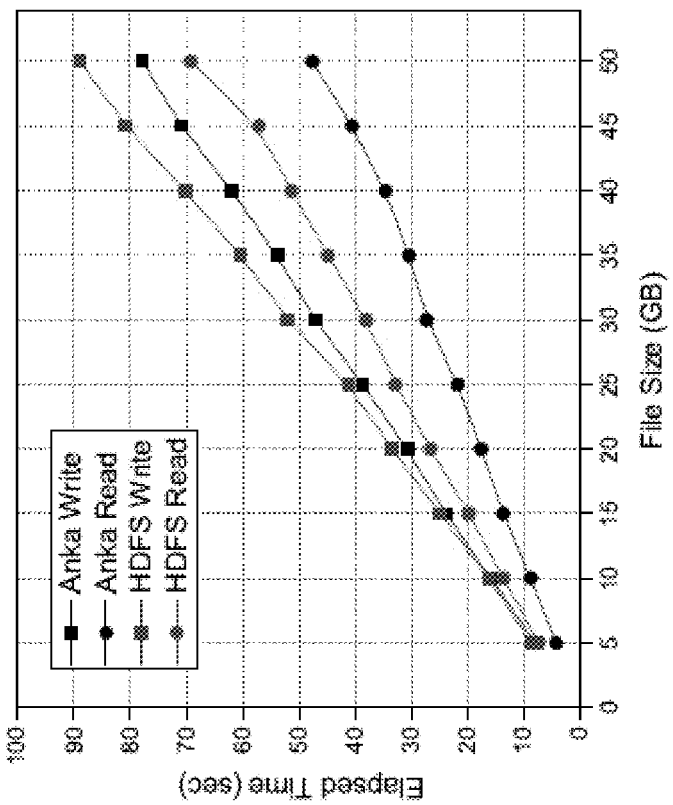
Fig. 14

STATISTIC MULTIPLEXED COMPUTING SYSTEM FOR NETWORK-SCALE RELIABLE HIGH-PERFORMANCE SERVICES

CROSS-REFERENCE TO RELATED APPLICATIONS

This application is a '371 national stage entry of PCT application No. PCT/US17/61492, filed Nov. 14, 2017, which claims priority to U.S. Provisional Application No. 62/421,642, filed on Nov. 14, 2016, both of which are incorporated herein by reference in their entireties.

STATEMENT REGARDING FEDERALLY SPONSORED RESEARCH OR DEVELOPMENT

This invention was made with government support under Grant No. #CNS0958854, #1507451, and #CH-817746 awarded by the National Science Foundation (NSF) for computing resources and other assistance. The government has certain rights in the invention.

BACKGROUND OF THE INVENTION

As the internet of things proliferates, generating more and more digital data, the time needed to process that data grows in proportion. Personal data, financial records, and information gathered by sensors and satellites all need to be collected and processed to be used effectively. Increased processing capacity facilitates not only the exchange of information, but also has become an indispensable tool for new scientific discoveries and effective economic development. For much of its early history, speed in computing has been gained by increasing clock cycles and shrinking the individual circuit sizes to be able to fit more and more of them on a single piece of silicon, following an exponential growth curve as observed by Moore's Law. As manufacturers approached the physical limits of feature miniaturization, performance in single-processor systems plateaued. Further needs for increased processing speed have been met by clustering multiple processors together, either physically in multi-core or multi-processor configurations, or virtually via computing clouds.

Reliable inter-process communication is essential in large scale computing services. When a central supervisor node launches thousands, or millions, of sub-process "workers," the supervisor needs to know when a worker completes its task, or needs input from the supervisor or another worker to continue. A widely-practiced misconception in distributed parallel computing is to assume that the network is reliable, as described by Ingrid Van Den Hoogen in "Deutsch's Fallacies, 10 Years Later," in the Java Developer Journal, http://java.sys-con.com/node/38665, Jan. 8, 2004. This perceived reliability is inferred because the Transmission Control Protocol (TCP) protocol guarantees reliable, ordered packet transmission from one party to another through the Transport Layer of the Open Systems Interconnect Model (OSI). However, network communication can only be reliable if both the sender and the receiver are 100% reliable and there is a sufficient supply of unreliable intermediaries. The TCP protocol cannot protect the end points from crashing. Reliable communication is impossible when the end-points can crash arbitrarily, as proved in "The Impossibility of Implementing Reliable Communication in the Face of Crashes", Alan Fekete, Nancy Lynch, Yishay Mansour and John Spinelli, Journal of the ACM, Vol. 40, Issue 5 (November 1993).

Under the typical client-server computing model, a widely practiced fallacy is to use the OSI model directly for both client and service side programming. Any failure of the communicating programs will crash the entire service. As a result, arbitrary data losses cannot be prevented. Although the probability of an individual communicating program failing is small, the rapid expansion of processing infrastructure causes incrementally worsening service downtimes and data losses. Adding hardware resources to enhance the performance of a service actually decreases its reliability. While networks continue to expand and enhance, reliable network-scale computing is not yet feasible. On the other hand, reliable communication using faulty networks was proven feasible in theory by John Spinelli and others and proven in practice by the fledgling Internet developments.

Thus, there is a need in the art for an improved method of fault-tolerant large scale clustered parallel computing, capable of guaranteeing service reliability, performance, and data fidelity regardless of the scale of the networked processing infrastructure. The present invention satisfied this need.

SUMMARY OF THE INVENTION

This invention draws a distinction between client-side and service-side programming. The disclosed application programming interfaces (API) and processing architectures have no assumption on the reliability of processors, networks and storage. Therefore, the resulting computer service will continue to operate until the last available resources.

In one aspect, a method of network-scale parallel computing comprises executing a computational process from a set of at least one client node, distributing a set of computational instructions with data derived from the computational process among a set of at least one worker nodes via a content addressable service network through a single-sided statistic multiplexed computing (SMC) protocol implemented based on a Unidirectional Virtual Ring (UVR) architecture, maintaining a global data store using a Tuple Space abstraction, and sending a first single-sided communication message from the at least one client node to the at least one worker nodes over the content addressable service network, wherein the first single-sided communication message sent from the at least one client node is assigned an expected completion time, wherein the at least one worker nodes are connected via the content addressable service network implemented using the Unidirectional Virtual Ring architecture, and wherein the at least one client node sends a retransmission of the first single-sided message if a first communication response is not received within the expected completion time, and the retransmission of the first single-sided message is sent via a different path than the first single-sided message so the corresponding computing task can be completed by a different processor node. Therefore, the completeness of the computation tasks is ensured by the client regardless partial failures in networks and processors.

In another aspect, a network-scale distributed storage system comprises at least one client node, a plurality of storage nodes connected by a set of redundant communication links via a content addressable service network implemented using distributed Statistic Multiplexed Computing protocols, and a global virtual Tuple Space accessible via the (key, value) pairs API based on a Unidirectional Virtual Ring architecture. In one embodiment, each storage node comprises a transaction replication gateway, configured to provide dynamic serialization of concurrent update queries for synchronized parallel replication, dynamic query load balancing, and non-stop database resynchronization. The plurality of storage nodes communicate with one another only via a single-sided (key, value) API.

In some embodiments, the method further comprises the steps of placing replication markup language statements in the data client programs in order to deliver consistent data and transaction replication amongst the plurality of storage or database nodes while allowing multiple concurrent long-running update queries. In one embodiment, the replication markup language has forms of (lock, name) and (unlock, name). Therefore, the gateway can dynamically serialize the concurrent data updates in the plurality of storage or database nodes.

In one embodiment, the method further comprises the steps of providing a wrapped communication interface for a partitioned existing parallel processing application that uses, without limitation, any communications protocol based application programming interfaces, including any legacy or OSI based legacy application programming interfaces, such as Message Passing Interface (MPI), OpenMP, Remote Method Invocation (RMI) and Remote Procedure Call (RPC), translating the partitioned legacy program's messages, into the single-sided SMC protocol, and translating the single-sided SMC protocol messages back to legacy messages for enabling the legacy application's dynamic performance tuning without reprogramming, and providing the legacy application fault tolerance without checkpoints.

In one embodiment, the system further comprises a Domain Name System (DNS) server responsible for translating a single public service Uniform Resource Locator (URL) to any node address on the Unidirectional Virtual Ring. In this embodiment, the DNS server further comprises a network-scale distributed storage system comprising a content addressable service network implemented via a Unidirectional Virtual Ring architecture. In this embodiment, the DNS client implements timeout retransmission and redundancy elimination protocols.

In another aspect, a network-scale parallel computing system comprises a client node and a content addressable service network, comprising a plurality of distributed Statistic Multiplexed Computing nodes implementing a Tuple Space abstraction, and based on a Unidirectional Virtual Ring architecture, a plurality of redundant networks, wherein each of the plurality of nodes is communicatively connected to all available networks, and a plurality of storage nodes connected on the same UVR network, that each of the storage nodes also comprises a transaction replication gateway, and that the application client implements timeout retransmission and redundancy elimination protocols to enable general purpose Hybrid Transaction Analytical Processing (HTAP) services. In these embodiments, any transaction and analytics task can be completed by any subset of processors, networks, storages and databases, thus enabling non-stop services without planned or unplanned downtimes regardless of the scale of the network infrastructure.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 1A-1B is a diagram illustrating the concept of one embodiment of the invention compared to the standard OSI model client-server paradigm.

FIG. 13 is a graph depicting replication performance over a variety of file sizes.

FIG. 14 is a graph showing read and write performance of AnkaStore vs. Hadoop File System.

DETAILED DESCRIPTION

Figure 2:
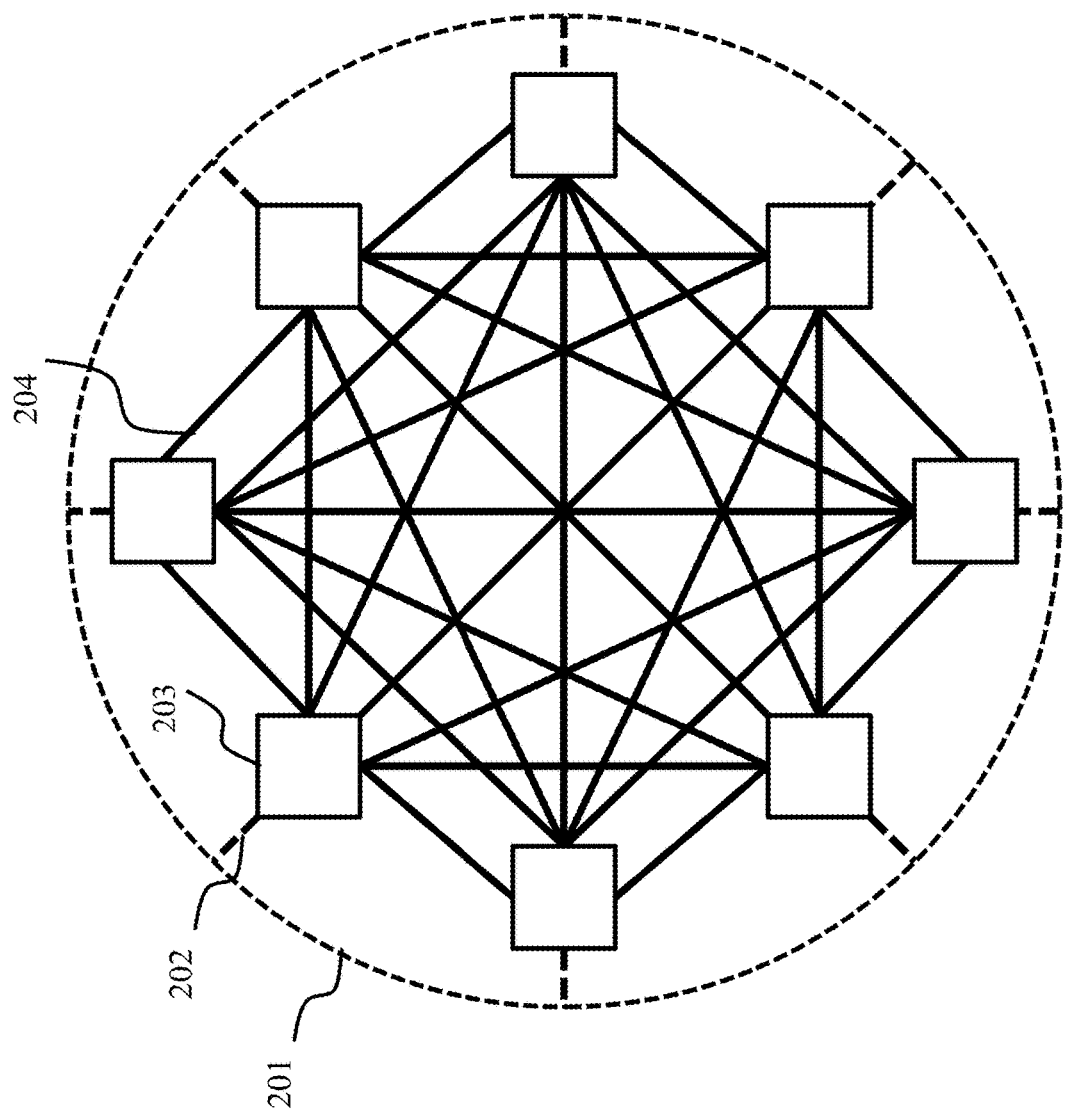
FIG. 2 is a diagram of a Unidirectional Virtual Ring architecture.

It is to be understood that the figures and descriptions of the present invention have been simplified to illustrate elements that are relevant for a clear understanding of the present invention, while eliminating, for the purpose of clarity, many other elements found in typical electronic performance assessment systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art by citing related references.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

As contemplated herein, the systems and methods of the present invention greatly improve parallel processing performance by increasing the reliability and decreasing the volume of communication among the various parallel processes completing the task.

The system of the present invention may operate on a computer platform, such as a local or remote executable software platform, or as a hosted internet or network program or portal. In certain embodiments, only portions of the system may be computer operated, or in other embodiments, the entire system may be computer operated. As contemplated herein, any computing device as would be understood by those skilled in the art may be used with the system, including desktop or mobile devices, laptops, desktops, tablets, smartphones or other wireless digital/cellular phones, televisions or other thin client devices as would be understood by those skilled in the art.

As contemplated herein, any network device as would be understood by those skilled in the art may be used with the system, including high performance network switches, such as Infiniband, Omni-Path, wired and wireless networks, and satellite communication networks as would be understood by those skilled in the art.

As contemplated herein, any storage device as would be understood by those skilled in the art may be used with the system, including traditional spindle disks, solid state disks, optical disks and others as would be understood by those skilled in the art.

As used herein, the following acronyms and abbreviations refer to the following terms: "IP" refers to Internet Protocol; "IEEE" refers to the Institute of Electrical and Electronics Engineers; "CAP," referred to herein in the context of the "CAP Theorem" refers to Consistency, Availability, and Partition Tolerance; "HPC" refers to High-Performance Computing. "CPU" refers to central processing unit.

One key to the system of the present invention is an address-less service computing architecture for Internet-scale, mission-critical computing services using faulty computers, storages, databases and networks based on the principle of implementing reliable Internet communication using faulty networks. The critical element is a shift in the programming paradigm from the traditional end-to-end (client-server) computing to single-sided statistic multiplexed service computing.

As contemplated herein and illustrated in FIG. 1B, an IP address-less service network 112 is organized behind a single public Uniform Resource Locator (URL) 114 to the service client 111 as compared to the OSI-based client-server paradigm shown in FIG. 1A. The traditional OSI-based client-server paradigm, shown with client 101 and server 102 communicating over faulty network 103 to public URL 104, only enjoys the reliable data communication using faulty networks but suffers the impossibility of reliable service in the face of server crashes 105. The IP address-less service network 112 relies on a single-sided content addressable network protocol in order to leverage the same statistic multiplexing principles for reliable computing using faulty computers, storages, databases and networks. In this way, a single crash 115 may be isolated within the IP address-less service network 112, and will not impact the reliability of the service delivery for with the client 111 over faulty processors, storage or network 113.

With reference now to FIG. 2, in an exemplary embodiment, multiple worker nodes 202 each have a set of node resources 203, including memory, storage, and network interfaces associated with the node 202. Nodes 202 are connected to one another by a plurality of independently configured network links 204, such that there are multiple, redundant paths from each worker node 202 to every other worker node. The worker nodes are further each connected to a Unidirectional Virtual Ring (UVR) 201. In the exemplary embodiment shown in FIG. 2, the graph of worker nodes is fully connected, but in other embodiments, the graph could be less than fully connected. The service will survive using the minimum survival resource set (hereinafter MSRS). Once the program and data are completely decoupled from processors, networks, and storage, as provided herein, the minimal survivable resource set for the program is any single processor with a single network and a single storage. This "best effort computing" paradigm is best thought of as analogous to the "best effort communication" idea of packet-switching networks on the Internet. As used herein, "complete decoupling" of program and data from processors, networks and storages means that all programs are composed without any reliability assumptions of processors, networks and storages, and once imported, data will exist in the content addressable network until the last storage device fails. This ideal is met by the "Content Addressable Network" (CAN), embodiments of which are disclosed herein. The CAN is implementable using a Tuple Space abstraction and the UVR architecture.

In some embodiments, the redundant physical connections 204 are implemented for each host. In one embodiment, the worker nodes 202 are virtual hosts, residing on a virtual machine hypervisor such as VMWare or Amazon EC2. In the event that two worker nodes 202 are on a same shared physical host, some or all of the communication between them might be transmitted via virtual network connections controlled by and enclosed within the same shared physical host. A worker node may be a single-threaded process running on an individual processor or processor core, or it may be a multi-threaded process running on a plurality of individual processors or cores on a single host. In other embodiments, a parallel process running on a plurality of virtual or physical hosts, each comprising at least one processor, each processor comprising at least one processing core, may be considered a single worker node. In some embodiments, the worker node is a process running on an inferred "soft-core" CPU disposed within a field-programmable gate array (FPGA) or other programmable logic device. The worker node may also be a single-board computer, such as a Raspberry Pi or other comparable device.

In some embodiments, the connections 204 between the worker nodes 202 are Ethernet, fiber-optic, or InfiniBand connections. In other embodiments, some or all of the redundant network connections 204 could be implemented wirelessly, using protocols including but not limited to IEEE 802.11, Bluetooth, or cellular networking protocols. The communication between the nodes may utilize any type of encryption known in the art.

Figure 3:
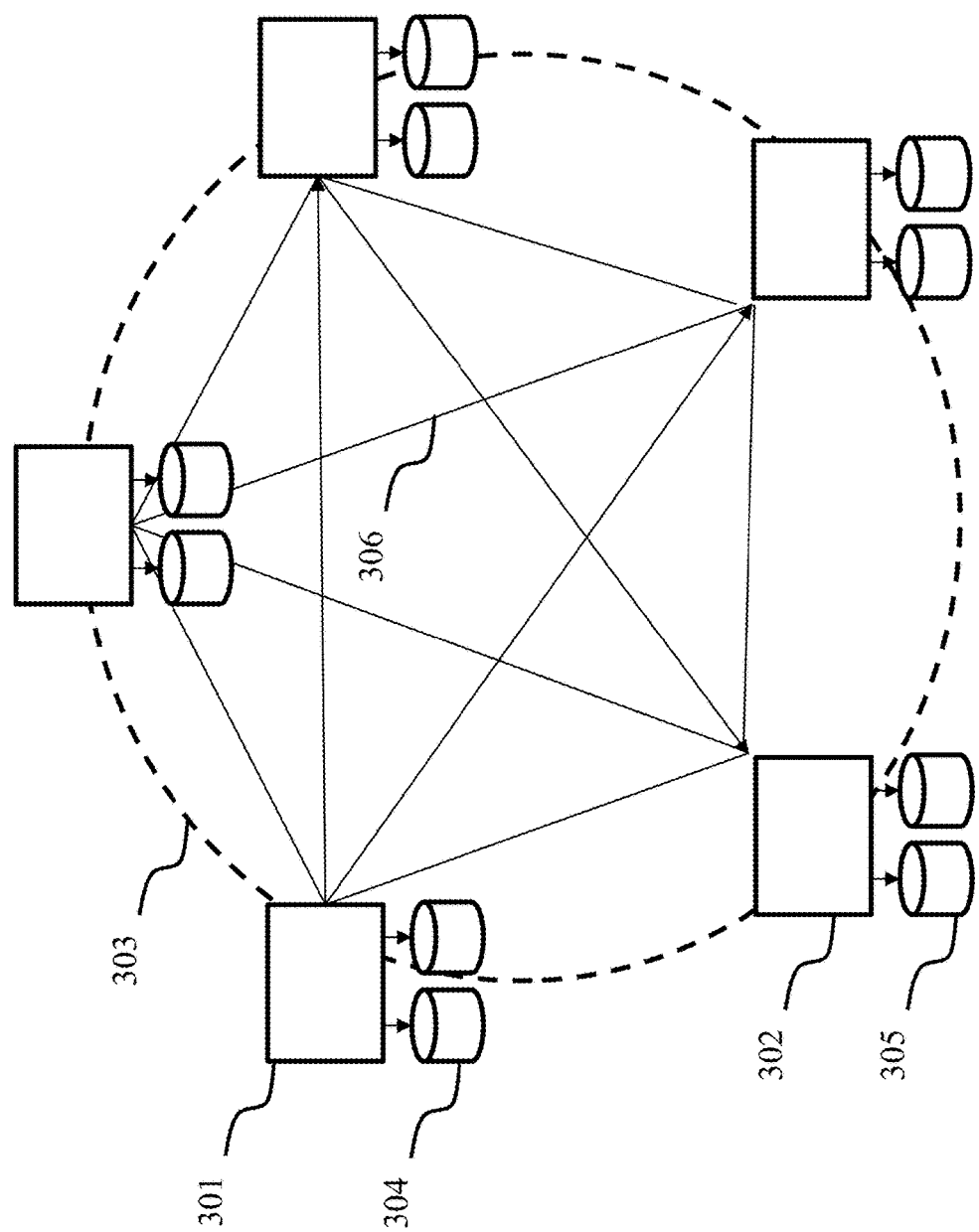
FIG. 3 is a diagram of a UVR based storage.

An embodiment of a layered UVR network for storage or database services is shown in FIG. 3. Each node contains a data replication gateway (GW) 301 or 302. Given the user defined replication factor R, each GW has three capabilities: a) Dynamic serialization of concurrent updates for synchronously replicating data changes in parallel, b) dynamic load balancing of "read" queries" and c) non-stop data resynchronization for restoring data on a new or repaired storage or database node 304 or 305 into the UVR cluster. All client data requests or query are injected into UVR 303. The GWs then respond with matching capabilities. The data request or query is automatically replicated through the corresponding GW to R downstream storage nodes 304 or 305. A round-robin load distribution algorithm ensures all storage nodes will be exploited evenly. In the case of a node failure, its replica will be the next in line for service automatically. The failed storage node can be repaired or replaced by a new storage node. Each GW is responsible for resynchronizing the new storage nodes with identical data contents without stopping service regardless of the size of data. Since there is no single point of failure in this storage or database cluster, the infrastructure can expand indefinitely to meet the growing performance and reliability demands, as long as P>>R, where P is the number of parallel partitions of a single file or data table and R is the degree of replication. The value R defines the "best case survivable resource set" size. This UVR cluster can sustain at most R−1 simultaneous storage or database failures without data loss or service interruptions. In this embodiment, the "minimal survivable resource set" is a single viable computer with local storage, memory and at least one viable network interface.

In one embodiment, the UVR storage client structure, unlike traditional Remote Procedure Call (RPC) based storage clients, must include a self-stabilizing retransmission protocol when a storage service endures a timeout. If the number of retransmission attempts exceeds the degree of replication factor R, the infrastructure may have exhausted the best case survivable resource set. In some embodiments, a data redundancy check is implemented in the UVR storage protocol automatically. Because of the redundancy check implemented in the UVR, the client program therefore does not require its own data redundancy check.

In one embodiment, the UVR database service client structure includes concurrency control mark-up statements for masking concurrent updating transactions to prevent race conditions and deadlocks. For each transaction commit phase, an additional retransmission and optional redundancy checks may be required in order to guarantee proper execution. In one embodiment, the concurrency control markup statements use (lock, name) pairs for marking concurrent update queries in order to protect data consistency.

Unlike existing storage and database clusters, SMC UVR clusters of the present invention have zero data losses as long as the infrastructure affords an R redundant dataset. Thus, an SMC UVR cluster is capable of overcoming the CAP Theorem, given infinite computers, storages and network supplies, promising to deliver arbitrary performance requirements, constrained only by the economic law of diminishing returns. Therefore, data consistency can be guaranteed on an Internet-scale storage and database service.

Figure 4:
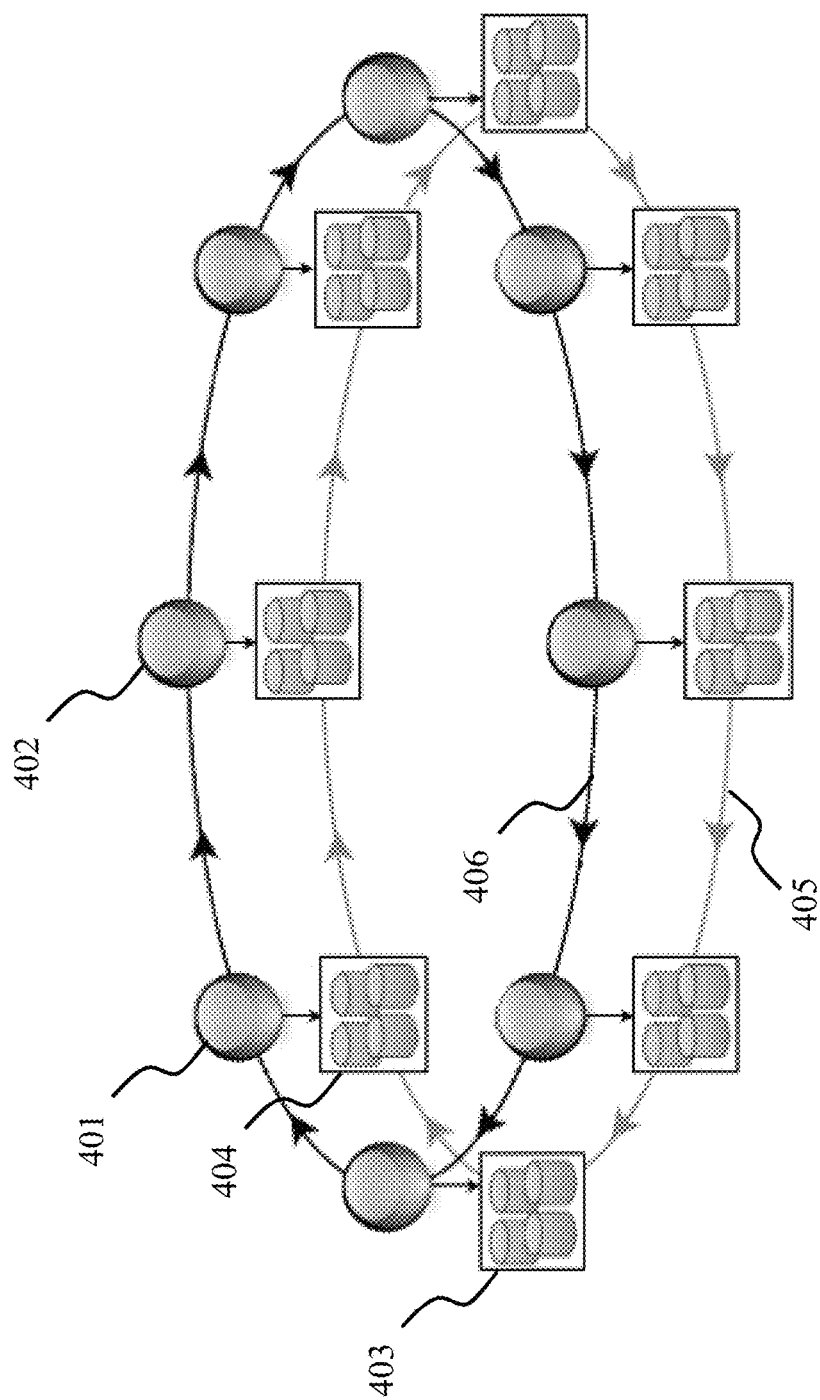
FIG. 4 is a diagram of a layered UVR implementing a UVR based storage.

With reference to FIG. 4, a layered computing and storage UVR service network is shown. The layered UVR of 4 comprises two UVRs 405 and 406. The top UVR 406 joins a plurality of computing nodes comprising metadata servers 401, 402, while the bottom UVR 405 joins a plurality of data servers 403, 404. The layered UVR structure shown is particularly useful for data-intensive computing services, where workers running on computing nodes 401, 402 need quick, reliable access to data.

Aspects of the present invention relate to communication via a tuple-space abstraction via three protocol calls: "put", "read" and "get" under the UVR network architecture. In some embodiments, each node on a UVR runs a tuple space server that supports these three protocol calls. The tuple space abstraction is implemented via the UVR. Each tuple is in the form of <key, value> pair where the "read" or "get" protocol can fetch the tuple contents with a matching key containing an arbitrary key pattern. The "put" protocol injects a <key, value> pair into the tuple space. In one embodiment, all service programs must communicate using only these three calls in order fully to implement service content addressable computing. In some embodiments, a user application starts by announcing the availability of a tuple via the "put" call on the UVR. The tuple will then be seamlessly replicated into the tuple space stored on some or all nodes in the UVR. All nodes capable of processing the tuple will compete for the right to process. The "get" protocol ensures that only one node can process the tuple. Each new tuple represents a sub-task. A return result is expected. The tuple matching process enables automatic dataflow parallel processing. All available processors and networks will be exploited automatically forming dynamic SIMD (single instruction multiple data), MIMD (multiple instruction multiple data) and pipelined clusters. In some embodiments, the client program implements the timeout retransmission and redundancy elimination protocols as known in the art of TCP/IP protocols. Therefore, the client program can deliver the complete computation results, immune to partial failures in processors and networks.

Figure 5A:
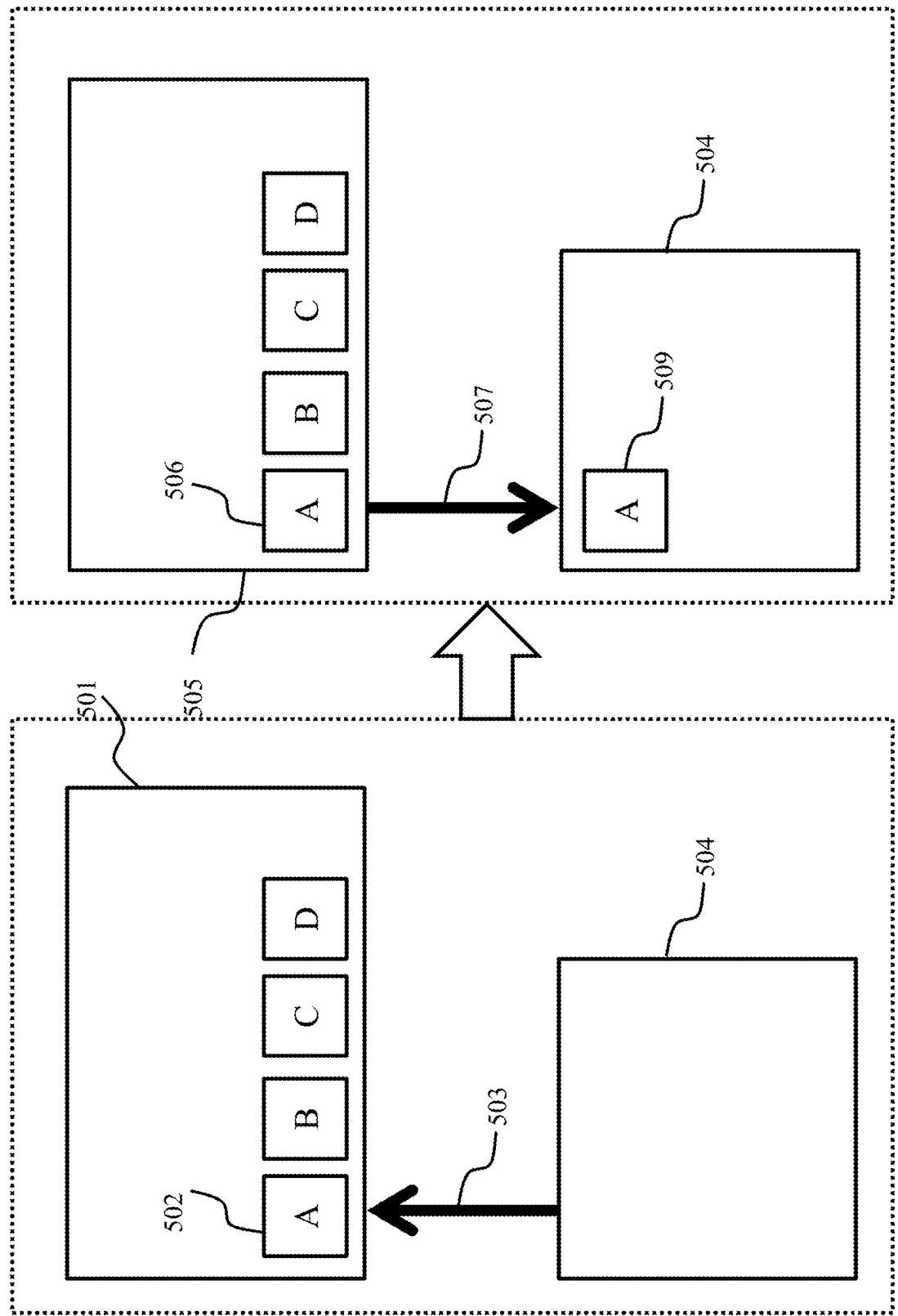
FIG. 5A-5D are flow diagrams demonstrating read, get, and put operations, and node failure.

With reference now to FIGS. 5A-5D, data flow diagrams show the operation of the read, get, and put operations upon which the single-sided Tuple Switching Network (hereinafter "TSN") is based. The TSN is also referred to as the content addressable network. FIG. 5A demonstrates a "read" operation, wherein a worker 504 requests information about a task 502 by issuing a "read" command 503 to the TSN 501. After the "read" command is received by the UVR, the supervisor 505 that owns the matching Tuple responds with the requested information 506 (the UVR representation of global Tuple 502) by direct communications 507 with 504. The requesting node 504 now has a copy of the data 509, while the original data 506 remains on the supervisor 505. The worker 504 is suspended until a read key pattern is matched.

Figure 5B:
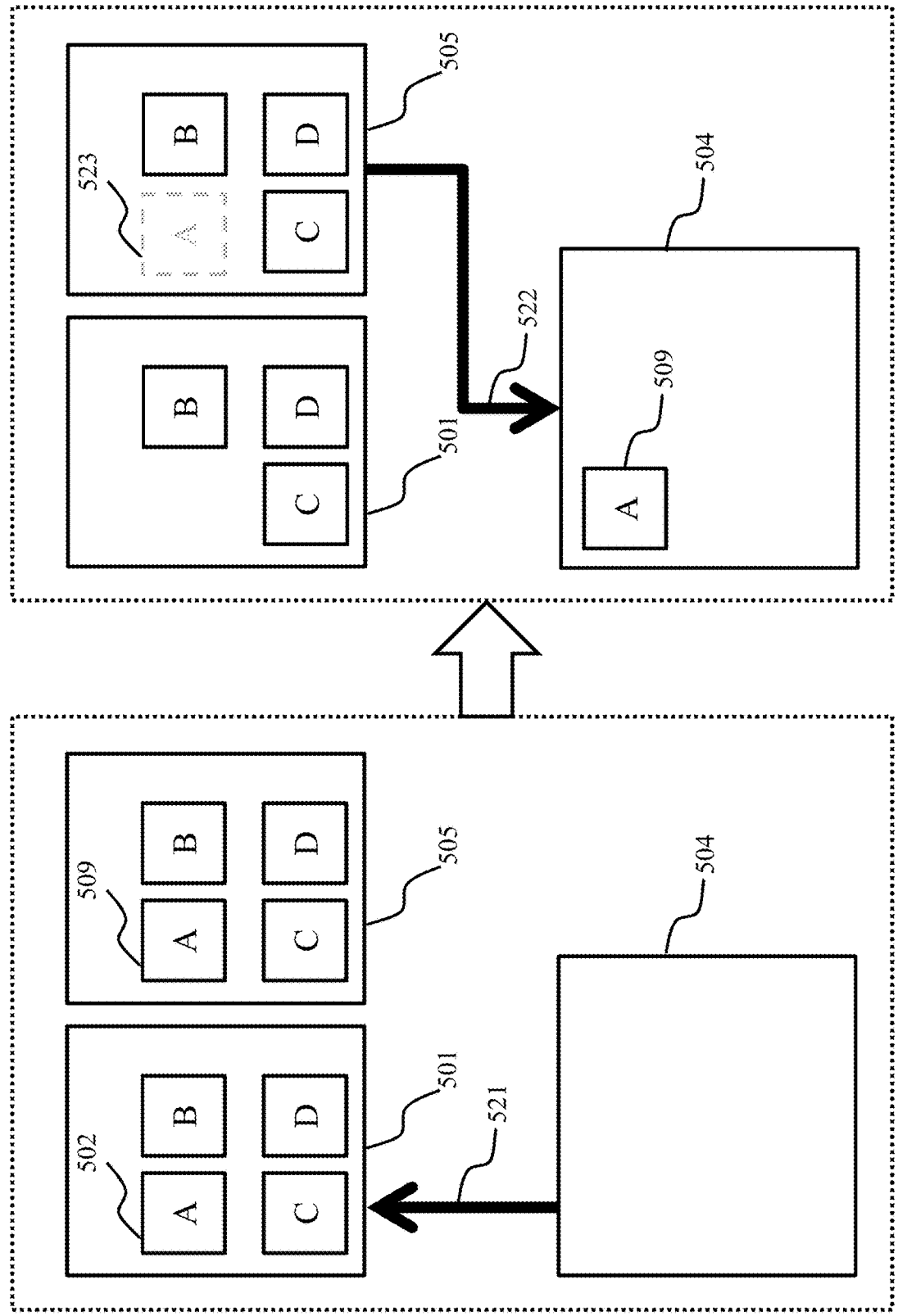

FIG. 5B demonstrates a "get" operation. A "get" is similar to a "read", except that after receiving a "get" 521 and transmitting the requested data 509 to the node 508 with a get response 522, the supervisor 505 sets the task data 509 to a "shadow" state 523 and removes its UVR representation 502. This indicates to other nodes that the task 523 has been "checked out" by the node for processing. Once checked out, the task 523 remains in a shadow state. When task 523's completion Tuple is received, Tuple 523 is removed. If the waiting time exceeds a predetermined threshold, the supervisor 505 will re-enable the shadow Tuple 523 which will allow a different worker to complete task 523.

Figure 5C:
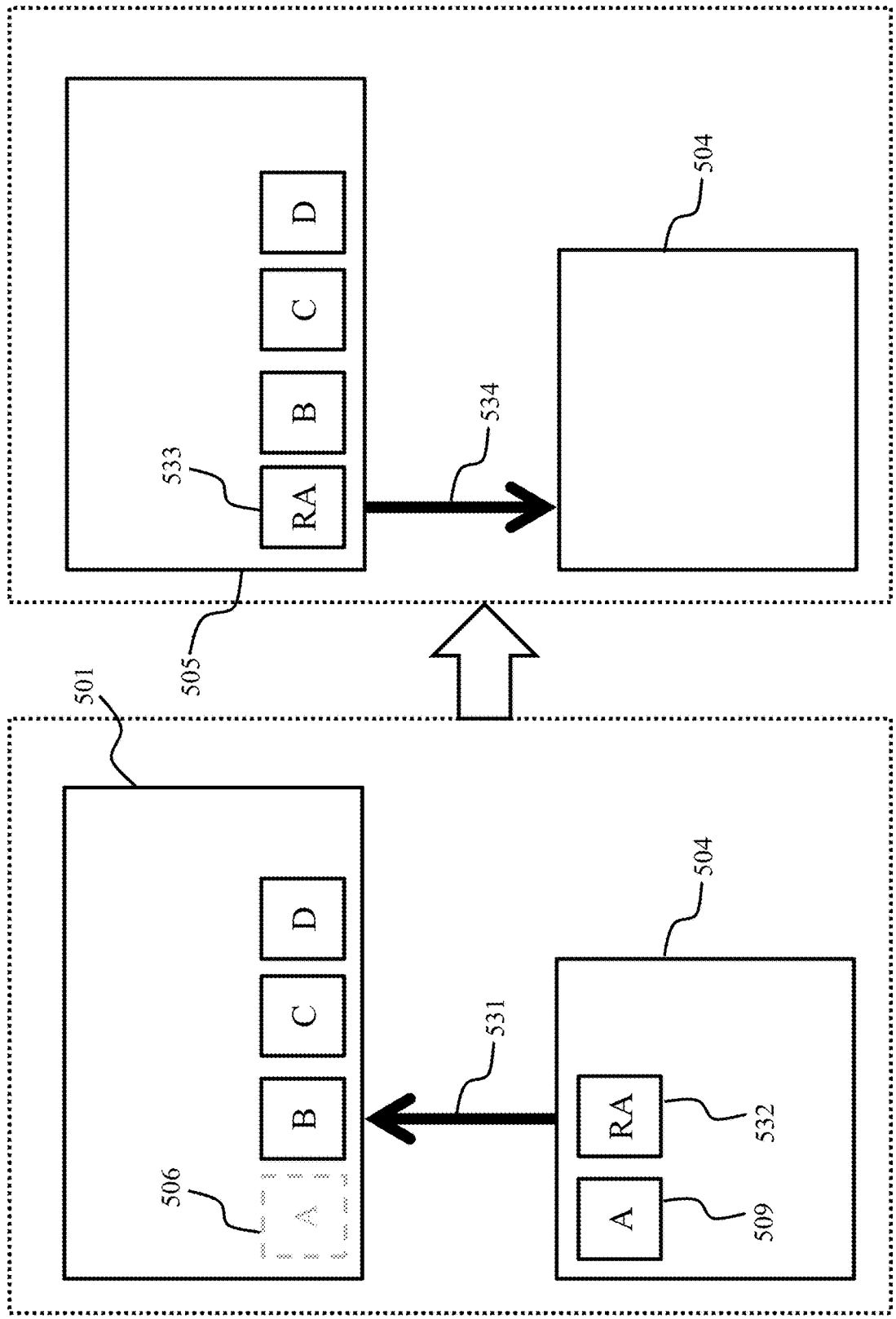

FIG. 5C demonstrates a "put" operation. After the node 504 has finished running the task 509, it produces a result 532. This result is transmitted back to the Tuple Space 501 in order to inform the completion of the task execution. The node 504 sends a put command 531 which contains the result 532 and a reference to the task 509 from which the result was calculated. Upon receiving the result, the supervisor 505 notes that the task 506, which was previously in a shadow state pending execution, was completed. The supervisor 505 then stores the result 533 and removes the completed task 506 from the list of unfinished tasks. If any processor or network failure causes the "put" operation to fail, the supervisor 505 will re-enable the original Tuple 506 so other workers can complete the remaining task.

It is understood by those skilled in the art that the "read" and "get" are "blocking operators" against the Tuple Space that the issuing program will suspend until the matching key pattern is found in the Tuple Space. The "put" command simply inserts a Tuple into the Tuple Space.

Figure 5D:
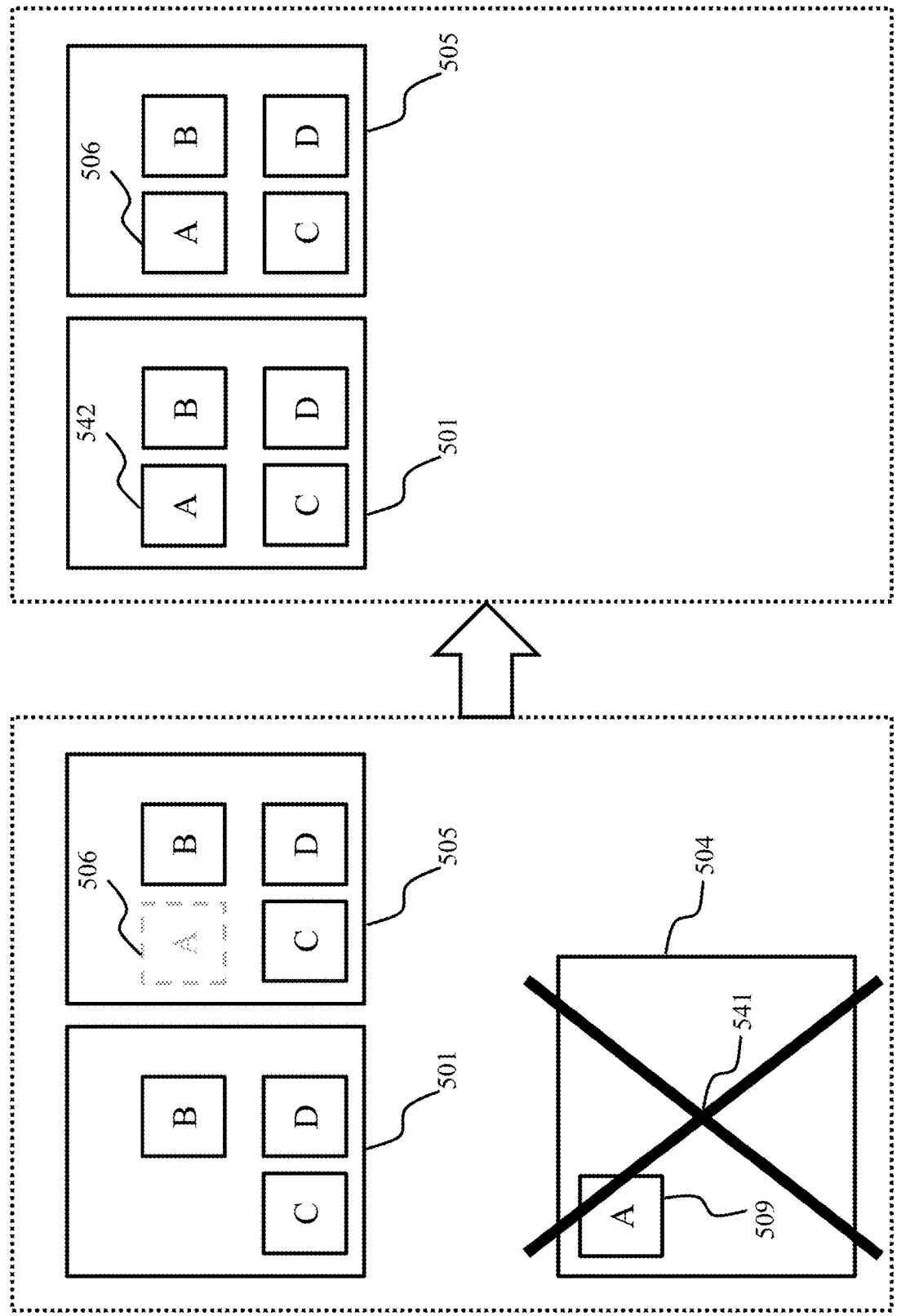

FIG. 5D demonstrates the behavior of a TSN system when a node or a communication link to a node fails. In this exemplary scenario, a node 504 has performed a "get" operation for a task 509 from the UVR Tuple Space 501. Tuple 506 was extracted from the Tuple Space and arrived at the worker 504 as data 509. The Tuple has been removed from supervisor 501. At some point in the execution of the task 509, the node 504 experiences a failure 541, from which it is unable to recover. At the time of the get operation, the supervisor 505 had placed the task 506 into a shadow state and started a timeout clock after sending Tuple 506 to worker 504 for data 509. Upon expiration of the timeout clock, the supervisor 505 recognizes that something has gone wrong with the execution of the task 509 because the supervisor 505 did not receive a response within the expected time. The supervisor 505 then reverts the shadow task 506 back to a normal task, and puts it back into the TSN space 501 as task 542, to be accessed again by another node able to perform the calculation. In this way, the present invention is an improvement over the prior art, because the parallel task can continue execution without data loss upon node failure.

Proper timeout and retransmission enforcement is essential in reliable communication. When a node or connection is lost as in FIG. 5D, the MSRS standard of the present invention (illustrated partially in FIG. 2) ensures that when a request times out, subsequent requests can be sent over a different physical or virtual route than the first one. In this way, the overall parallel process is robust against link failures or interface failures on one or more particular nodes.

In the preferred embodiment, the tuple space implements a service content addressable network via a <key, value> pair application programming interface (hereinafter "API"), wherein different platforms may use uniform semantics for inter-process communication. In one embodiment, the operators supported by the tuple space API are:
put(TupleName, PayLoad),
get(&TupleName, &Buffer), and
read(&TupleName, &Buffer).

In one embodiment, a node may issue a get("A*", &Buffer) into the tuple space, and this request will be processed by all Tuple Space servers on the UVR to (1) return the IP address of the node that holds the tuple content with a name starting with "A" and (2) extract the tuple from the space. A read("A*", &Buffer) request will trigger the same process except for the tuple extraction step. The tuple match will trigger the processing of the returned tuple according to the dataflow parallel processing principles. The entire UVR parallel architecture will automatically form SIMD, MIMD and pipeline clusters as the application progresses. The transfer of the tuple to the receiving node does not go through the UVR, rather the tuple is transmitted directly from the client to the node.

In one embodiment, a node may issue a read("A*", &Buffer) into the tuple space, and a supervisor will return tuple content with a name starting with "A". In the preferred embodiment, the parallel architecture includes multiple worker nodes, but may also include only a single worker node. In some embodiments, the plurality of worker nodes is overseen by a single supervisor. In other embodiments, the plurality of worker nodes is overseen by multiple supervisors. The overall parallel computing task or the tuple space may be initially divided and distributed among these multiple supervisors, facilitating effective load distribution.

In some embodiments, the crash of a computer or worker node will cause the client or master to enter a timeout event. When a timeout occurs, the retransmission discipline of the present invention will re-generate the original tuple, thus enabling the application to continue using the remaining resources. This mechanism will protect the application from multiple consecutive processor or network failures.

As discussed herein, in one embodiment, the minimal survivable resource set for a compute intensive application running on a UVR of the present invention is one (1) representing a single computer with local storage and at least one network interface. The above-described timeout retransmission process will continue until all application tasks are completed correctly. The client will enter an infinite wait when all UVR computers fail at the same time before completing all tasks.

For a storage or database service network, the minimal survivable resource set is defined by the degree of replication R>0. Storage or database clients with a self-stabilizing retransmission protocol will enter an infinite wait when R consecutive nodes fail at the same time.

In some embodiments, replication is handled by a data replication gateway, a load-balancing engine, and a non-stop resynchronization protocol, as detailed in US Published Patent Application Nos. US 2008/0046400 to Shi et al. and US 2009/0019258 to Shi, both of which are incorporated herein by reference in their entireties. Each node of the UVR as described herein may include a computing engine, a replication gateway, and a storage engine in a hybrid Transaction Analytical Processing (HTAP) system.

Figure 6:
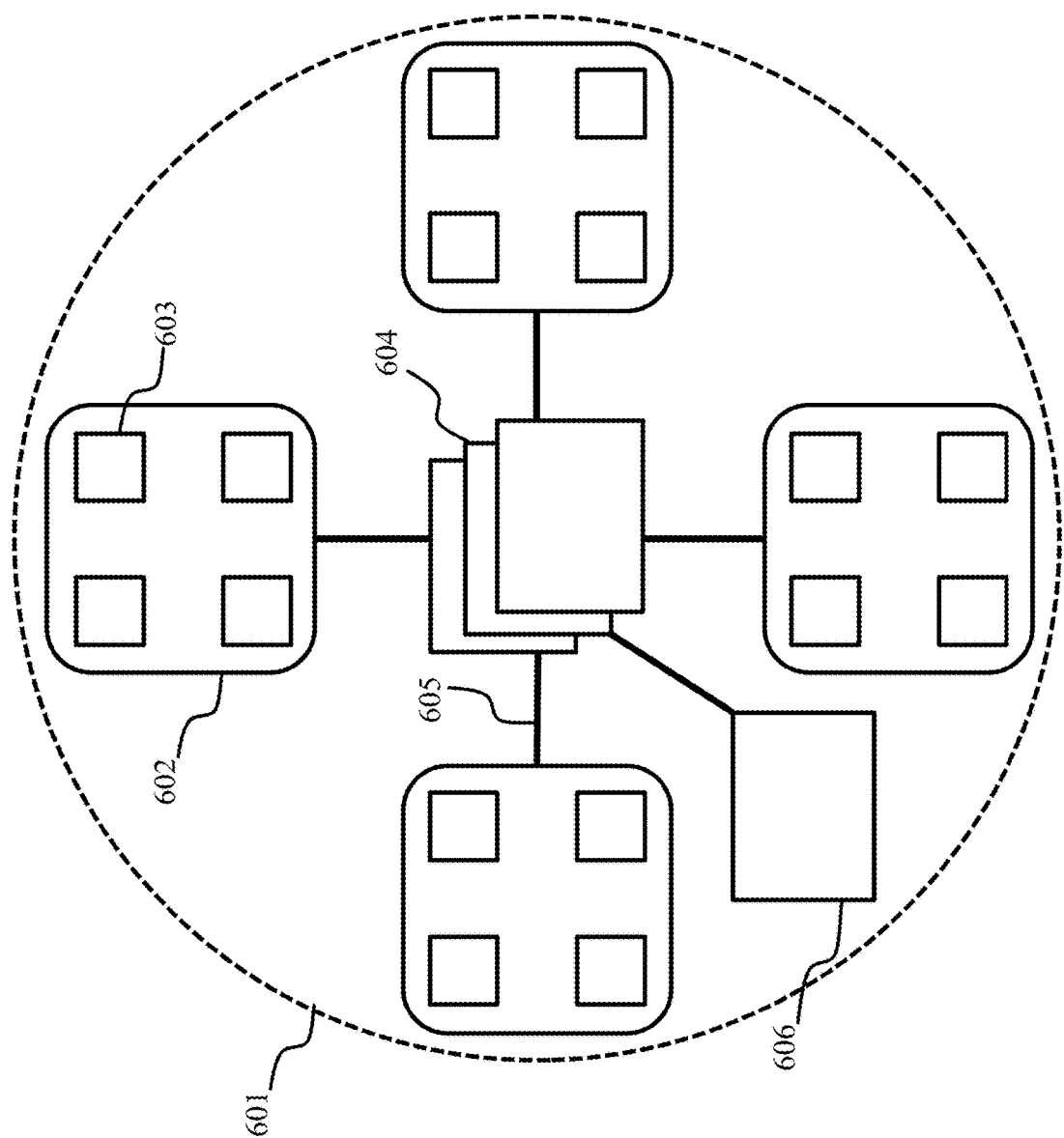
FIG. 6 is a diagram of the Statistic Multiplexed Computing (SMC) wrapper.

Often, a computing cluster relies heavily on the use of legacy application code, and reprogramming is cost-prohibitive. Although the SMC single-sided <key, value> pair API is incompatible with legacy APIs, such as MPI (Message Passing Interface), RPC (Remote Procedure Call), OpenMP (distributed memory sharing) and others, it is, however, possible to wrap legacy applications with the SMC single-sided <key, value> API to gain statistic multiplexed computing benefits. A legacy parallel program wrapper of the present invention allows the protection of existing investments in parallel programs using OSI paradigms, such as MPI (Message Passing Interface), RPC (Remote Procedure Call), OpenMP (share memory) and others. With reference now to FIG. 6, an embodiment of the SMC wrapper is shown. Existing HPC nodes 603 that communicate via a Message Passing Interface (MPI) or other legacy interface. HPC nodes 603 are segmented into small groups and wrapped with the SMC wrapper 602. The SMC wrapper 602 comprises an SMC gateway master, which communicates with the local workers 603 using their legacy protocols. The SMC wrappers 602 also communicate with the service client or SMC master 606 for initial job distribution and result submission. This allows each group of MPI nodes 603 to communicate with other groups via the SMC interface 605, implemented physically with a plurality of redundant network switches 604. In some embodiments, the SMC master 606 hosts the tuple space used by the superimposed SMC implementation. The effect is that the MPI nodes 603, communicating through the SMC wrapper 602, implement a unidirectional virtual ring network 601, also shown in FIG. 2. In some embodiments, wrappers of the present invention provide a wrapped communication interface for an existing parallel processing application that uses the Message Passing Interface (MPI) or other legacy protocols, translating node-level communications from direct TCP/IP to indirect statistic multiplexed computing protocols. As described herein, the legacy protocols are only responsible for parallel processing using multiple cores within each node or a small cluster of nodes. The wrapped application can then deliver improved performance and reliability by expanding the number of nodes or the number of small clusters with no increase in failure probability. The wrapped legacy application therefore has two advantages: fault tolerance allowing multiple simultaneous node failures without checkpoints and restarts, and the ability to tune processing granularity without re-compiling the legacy application.

The computer operable component(s) of the system may reside entirely on a single computing device, or may reside on a central server and run on any number of end-user devices via a communications network. The computing devices may include at least one processor, standard input and output devices, as well as all hardware and software typically found on computing devices for storing data and running programs, and for sending and receiving data over a network, if needed. The computing device(s) may also be connected directly or via a network to allow for the communication of files, email, software, and any other data format between two or more computing devices.

The communications network can be a wide area network and may be any suitable networked system understood by those having ordinary skill in the art, such as, for example, an open, wide area network (e.g., the internet), an electronic network, an optical network, a wireless network, a physically secure network or virtual private network, and any combinations thereof. The communications network may also include any intermediate nodes, such as gateways, routers, bridges, internet service provider networks, public-switched telephone networks, proxy servers, firewalls, and the like, such that the communications network may be suitable for the transmission of information items and other data throughout the system.

The communications network may use standard architecture and protocols as understood by those skilled in the art, such as, for example, high performance network switches, such as Infiniband or Omni-Path, Aries Interconnect or QLogic, or a packet switched network for transporting information and packets in accordance with a standard transmission control protocol/Internet protocol ("TCP/IP"). Any of the computing devices may be communicatively connected into the communications network through, for example, a traditional telephone service connection using a conventional modem, an integrated services digital network ("ISDN"), a cable connection including a data over cable system interface specification ("DOCSIS") cable modem, a digital subscriber line ("DSL"), a T1 line, or any other mechanism as understood by those skilled in the art. Additionally, the system may utilize any conventional operating platform or combination of platforms (Windows, Mac OS, Unix, Linux, Android, etc.) and may utilize any conventional networking and communications software as would be understood by those skilled in the art.

In one embodiment, a data intensive parallel computing system includes a plurality of compute nodes, a plurality of storage nodes, and a plurality of communication links; wherein the nodes and communication links form a layered Unidirectional Virtual Ring (UVR) and satisfy the minimum survival resource set for a mission critical transactional database service. In some embodiments, each node contains a gateway for transaction replication, dynamic load balancing and data resynchronization when accepting a new or repaired database node into service. A client connects to the UVR enabled DNS for database queries against an automatically selected UVR member. A read query will be directed to any of the replicated database nodes behind the gateway. An insert, update or delete query will be replicated to all database nodes behind the gateway. Dynamic serialization of concurrent transactions will commerce in real time in the gateway to ensure all database nodes contain identical data regardless of the order of query processing. When a database node fails, the gateway will automatically remove it from service. The gateway is also responsible for automatic data resynchronization when a new or repaired data node wishes to join the service without stopping the database service.

Unlike legacy programs, the Client or "master" programs of the present invention are structured differently than OSI model-based programs. In the SMC system of the present invention, the client must contain a self-stabilizing timeout-retransmission protocol, for example as described in "Self-Stabilizing Sliding Window ARQ Protocols", John Spinelli, IEEE Transactions on Networking, Vol. 5, No. 2 (April 1997). An exemplary self-stabilizing timeout-retransmission protocol includes a predetermined, assumed timeout value and an optional, application-dependent redundancy elimination process. Thus, the client or the "master" program can survive multiple simultaneous failures in worker nodes or networking components without the need for checkpoints.

One embodiment of the present invention comprises one or more UVR enhanced Domain Name System (DNS) servers in order to deliver reliable services. The DNS server or servers maintain the mapping between a single public Uniform Resource Locators (URLs) and a set of UVR node IP addresses. The service URL allows one or more clients to connect to the service from anywhere on the Internet. UVR enhanced DNS servers of the present invention may store mapping data on UVR storage networks, running in parallel with the mapping data automatically replicated on all nodes. Thus, the DNS servers can be distributed anywhere on the Internet without a single point of failure. For a Denial of Service (DoS) or Distributed Denial of Service (DDoS) attack to succeed against such a system, that attack would have to saturate all DNS servers and networks. Such a distributed DNS system has further advantages in being able to counteract ransomware attacks. In one embodiment, a UVR-enabled DNS is configured to neutralize a ransomware attack by using backup data or data replicated from a healthy node. In another embodiment, the UVR-enabled DNS is configured to recover its contents via non-stop service data resynchronization.

Figure 7:
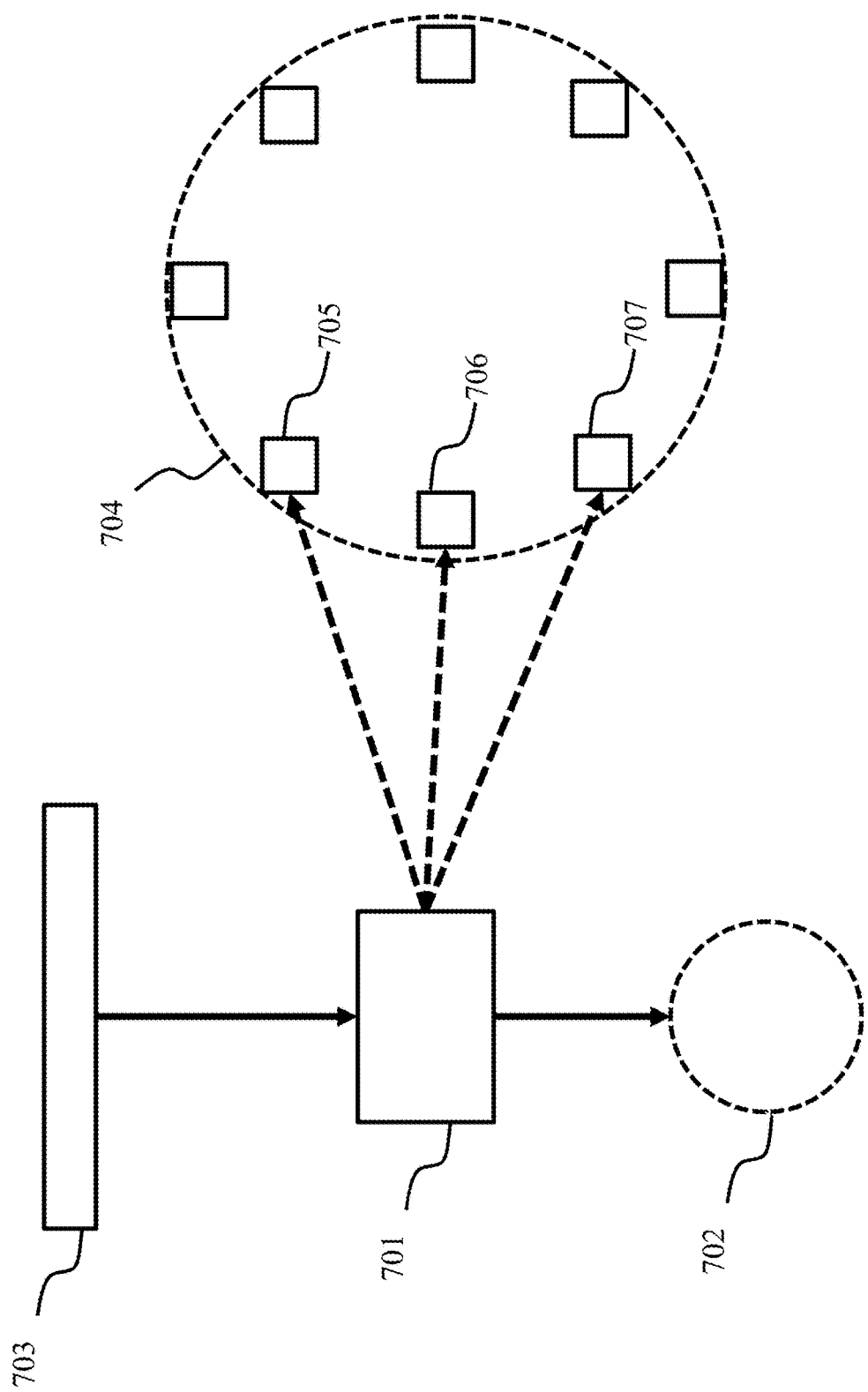
FIG. 7 is a diagram of a UVR-enabled DNS.

The UVR-enabled DNS may further be understood in view of FIG. 7, which depicts the mapping of a single public URL to one or more layered UVR service networks 704 via a modified DNS server 701. The modified DNS server 701 comprises a special purpose UVR storage cluster 702, which makes the DNS server resilient against multiple failures and DoS/DDoS attacks. When a client 703 requests a resource from the UVR service network, the query goes to the enhanced DNS server 701, which retrieves the record information from its dedicated UVR storage cluster 702. In some embodiments, the UVR storage cluster 702 is a layered UVR storage cluster like the one shown in FIG. 4. The record information retrieved from the UVR storage cluster is load-balanced to any one of the nodes 705, 706, 707 in the UVR service network 704, further distributing traffic and guarding against DDoS attacks. DNS servers are the final single point of failure in Internet scale services, and the addition of a UVR back-end cluster will remove that point of failure. An enhanced DNS cluster as shown can endure multiple simultaneous failures and DDoS attacks without data losses or storage interruptions.

In one embodiment, a method of the present invention comprises the steps of querying a UVR-enabled DNS server for a URL, wherein the UVR-enabled DNS server comprises a plurality of storage nodes, the storage nodes connected to one another through a plurality of redundant network connections. The UVR-enabled DNS server resolves the query through single-sided communication with any one of the storage nodes, all of which are configured to seamlessly replicate and update their data stores. In one embodiment, if one of the UVR-enabled DNS server nodes is disabled by a denial of service attack or hardware fault, the functionality of the DNS server as a whole is not significantly impacted, because no data is lost, and the DNS server can still communicate with any of the remaining storage nodes in order to resolve the query. In one embodiment, the DNS server supervisor node communicates with the plurality of storage nodes using key-value pairs or tuples.

In some embodiments, methods of the invention include executing a computational process solving a scientific problem. A supervisor client node distributes working assignments via single-sided <key, value> tuples transmitted via a UVR, comprising a plurality of nodes connected by redundant network connections. A set of <key, value> tuples are stored locally on some or all nodes, and their availability is made known to all participating nodes via the UVR network. A tuple-matching process commences automatically on all available computers via a Statistic Multiplexed Computing (SMC) daemon following the data parallel computing principles. Some or all data elements are transmitted in parallel using multiple redundant network components. The data matching process automatically forms SIMD (single instruction multiple data), MIMD (multiple instruction multiple data) and pipeline parallel processing structures dynamically. The process of tuple selection and matching continues until all tuples are processed and their results returned to the supervisor client node. The supervisor client node processes the received result tuples for redundancy and for re-transmission of the work assignment tuples if any result tuples are missing. The supervisor client can thus complete the entire application, provided that the processing infrastructure retains the minimal viable number of computers and networking resources. In some embodiments, if the processing infrastructure falls below the minimal viable number of computers or networking resources, the supervisor client enters a waiting state until sufficient resources are made available in the UVR.

Aspects of the present invention are directed to a distributed persistent data storage system. Such a storage system is useful for applications requiring fast data storage and processing, for example a process wherein a large amount of data needs to be transformed, processed, and/or stored for solving problems in science, engineering, or commerce. In some embodiments, computing and data storage tasks will be transmitted via <key, value> pairs in a layered UVR network. Some or all computing tuples will automatically form SIMD, MIMD and pipeline clusters at runtime. A storage layer protocol of the present invention is used to communicate with a data replication gateway that is responsible for synchronous data replication, dynamic load balancing and non-stop data resynchronization before a new or repaired node can join the service cluster. In some embodiments, a data replication gateway is present in each node, but in other embodiments a data replication gateway may be shared among multiple nodes. In one embodiment of a data request matching process, the data requests are matched automatically against the closest location on UVR. Proximity may be assessed by number of networking "hops", ping time, or any other suitable method known in the art of network distributed computing. In some embodiments, data fetching is conducted via multiple redundant network connections in parallel.

In some embodiments where a storage node fails, the storage node will have one or more replicas on the network, created by the one or more data replication gateways. Where the data from the failed node is requested after that node has failed, the failed node's replica will automatically be used to deliver the required data. Data storage commands may be transmitted via the layered UVR network and data exchanges may use all available redundant networking resources. As a result, data storage commands may be transmitted multiple times over multiple different routes, either sequentially or in parallel. This has the effect of eliminating single points of failure, thereby eliminating arbitrary data losses as well. Further, the infrastructure may expand arbitrarily without negative consequences, subject only to the economic law of diminishing returns. Consequently, embodiments of the present invention may provide consistency, availability, and partition tolerance, thereby overcoming the popular CAP Theorem, which states that one must select at most two of these capabilities.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of fault-tolerant and scalable parallel computing of the present invention. The following working examples therefore, specifically point out the preferred embodiments of the present invention, and are not to be construed as limiting in any way the remainder of the disclosure.

The present invention demonstrates significant improvements in performance of computing and data storage tasks. The improvement is illustrated by way of experimental examples, with results in the attached figures. In all reported tests, the program code was compiled with the gcc compiler and the optimization level set to —O3 at compile time. Where the prototype SMC program code is written in Java—called AnkaCom for computing and AnkaStore for storage—no compiler optimization option was available.

Figure 8:
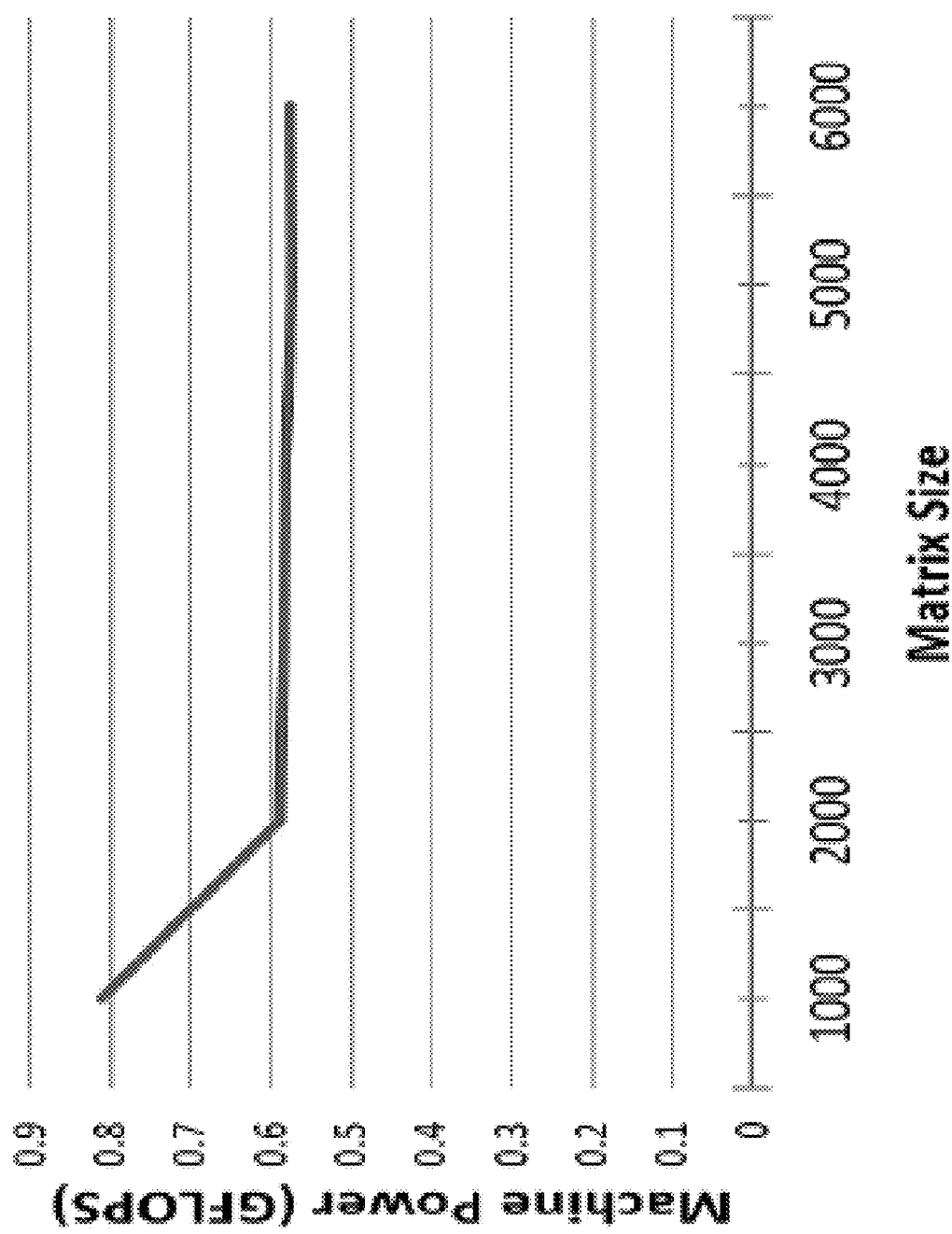
FIG. 8 is a graph of the performance of a single-core matrix multiplication algorithm as the matrix size increases.

Referring now to FIG. 8, the graph shows the machine power, measured in billions of floating-point operations per second (hereinafter "GFLOPS"), of a single core, sequentially-operated C program performing an N×N matrix multiply, where N is graphed on the x axis. This graph provides a baseline measurement and shows that without parallel processing, computing efficiency of the problem decreases rapidly before hitting a plateau. The particular significance of FIG. 8 is that it shows a typical "Cache, Memory, Swap, and Die" performance envelope. This performance profile enables quantitative application scalability analysis.

Figure 9:
FIG. 9 is a graph of single-node, single-core performance of Synergy, MPI, and Sequential architectures.

With reference now to FIG. 9, the graph depicts the single-core, single worker tests in GFLOPS for Synergy (top) Sequential execution (middle) and MPI (bottom). Here, Synergy is a C implementation of a SMC model, and MPI is a Message Passing Interface implementation programmed using OpenMPI 1.4.4. In this graph it is worth noting that the MPI implementation was not able to outperform basic sequential operation while operating in a single-core, single-worker system, but the Synergy implementation outperformed the sequential code for all matrix sizes.

Figure 10:
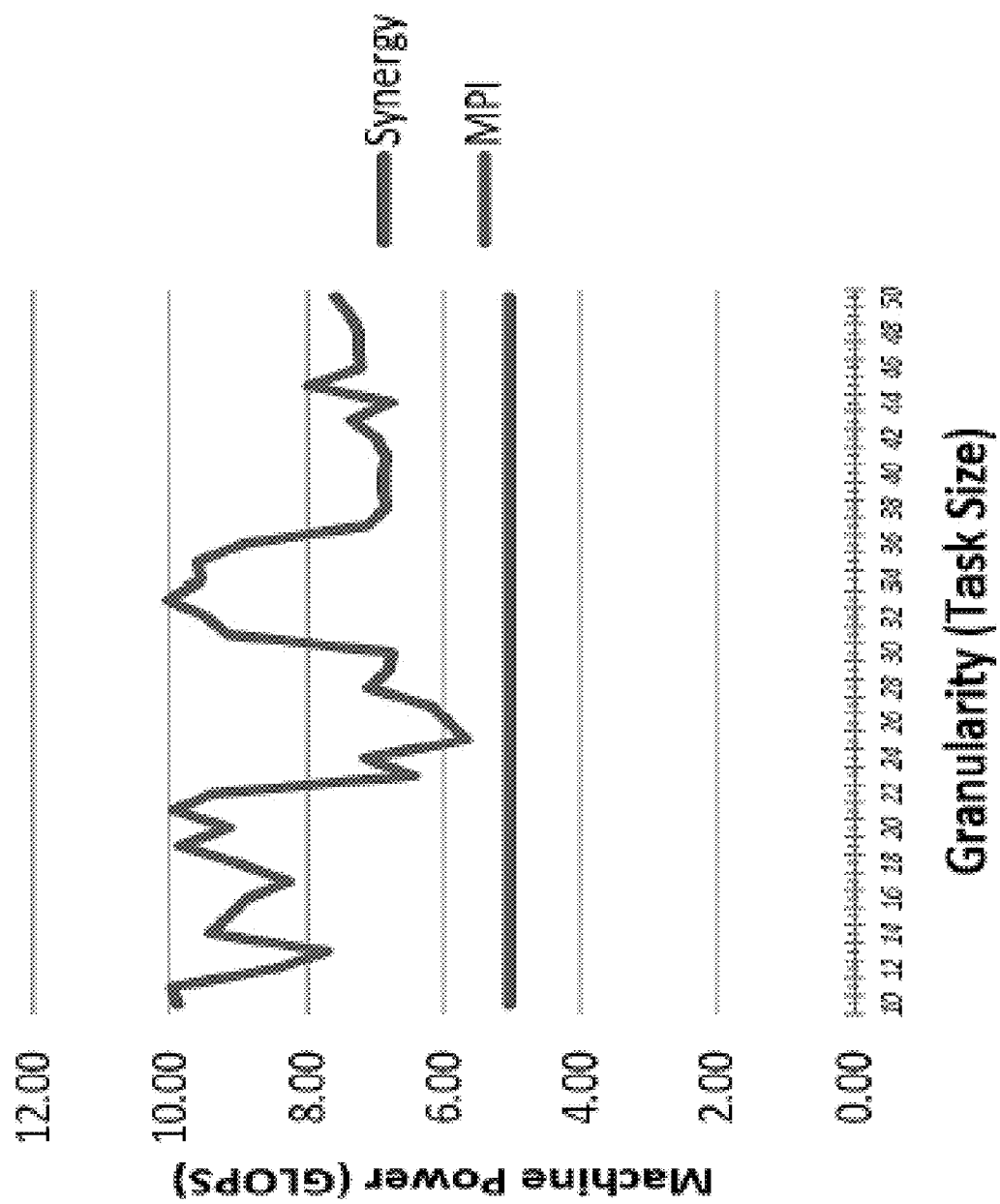
FIG. 10 is a graph of single-node, multi-core performance of the Synergy and MPI architectures over various task sizes.
Figure 11:
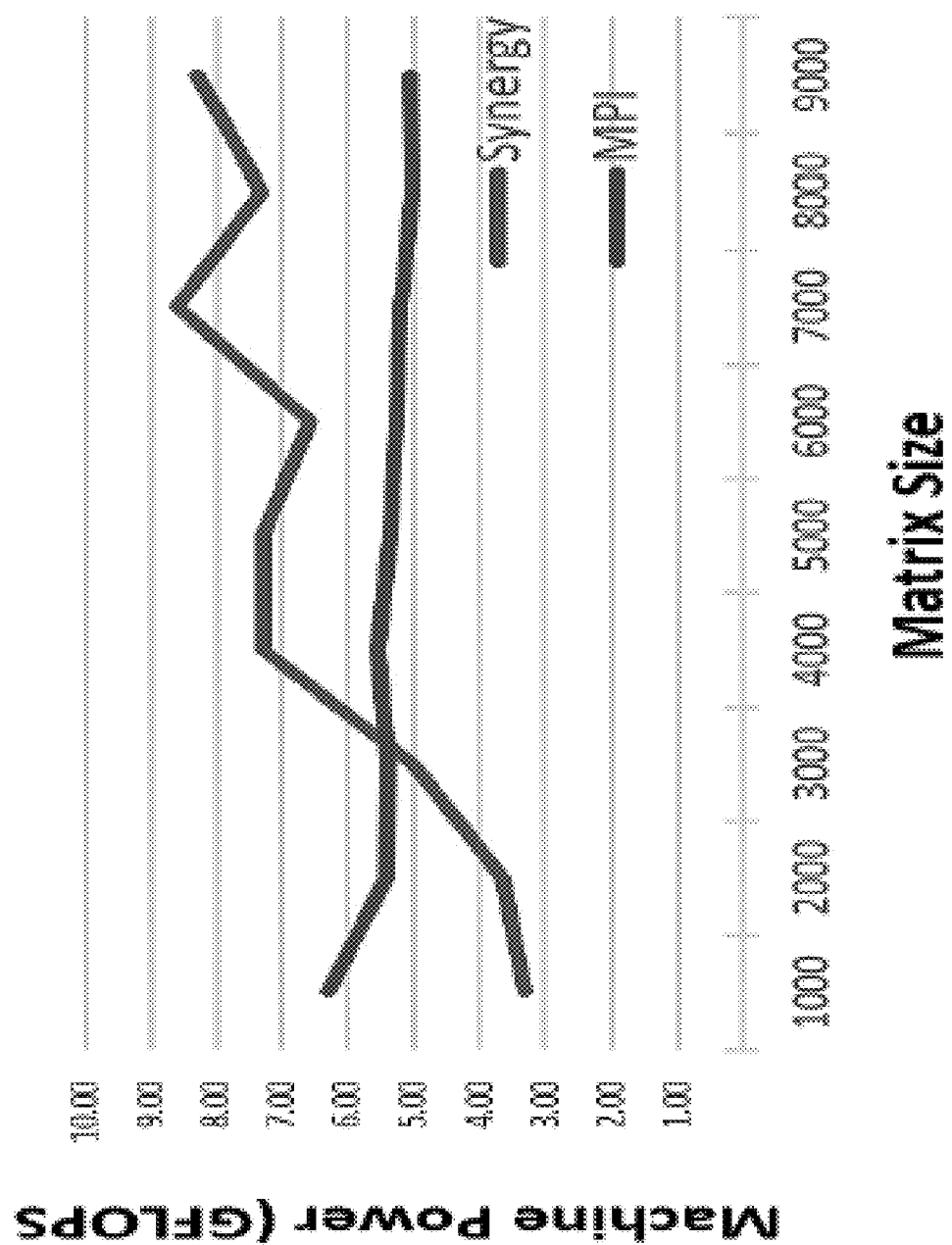
FIG. 11 is a graph of single-node, multi-core performance of Synergy and MPI architectures over various matrix sizes.

FIG. 10 and FIG. 11 demonstrate single-core, multi-node test results. FIG. 10 reports the granularity tuning results for Synergy on Chameleon with N=9000, P=45, where N is the size of the matrix and P is the number of cores in FIG. 10. The choice of P=45 was forced by MPI's fixed partition requirement. The maximum points of the graph, at task size of 11, 22, and 33, are where the total problem size divides evenly into the number of cores, meaning there is minimal synchronization overhead. From this data, the optimal performance configurations may be quantitatively predicted. The MPI implementation in FIG. 10 was programmed using OpenMPI 1.10.0 on CentOS Linux 7. As shown in FIG. 10, the Synergy (SMC) implementation outperformed the traditional (MPI) implementation for all task sizes. All experiments were conducted using the Chameleon bare metal high performance cluster.

Referring now to FIG. 11, the experiment compared the performance characteristics of Synergy and MPI implementations using a fixed task size (G=20), but varying the size of the matrix being multiplied. As shown, for problem sizes that are sufficiently large (N>3200), the Synergy implementation outperforms the MPI implementation. In this example, Synergy was running with fault tolerance enabled, demonstrating the unexpected result that it was possible to improve performance and stability at the same time. The MPI algorithm did not have its checkpoint component enabled, which would have further decreased performance.

Figure 12:
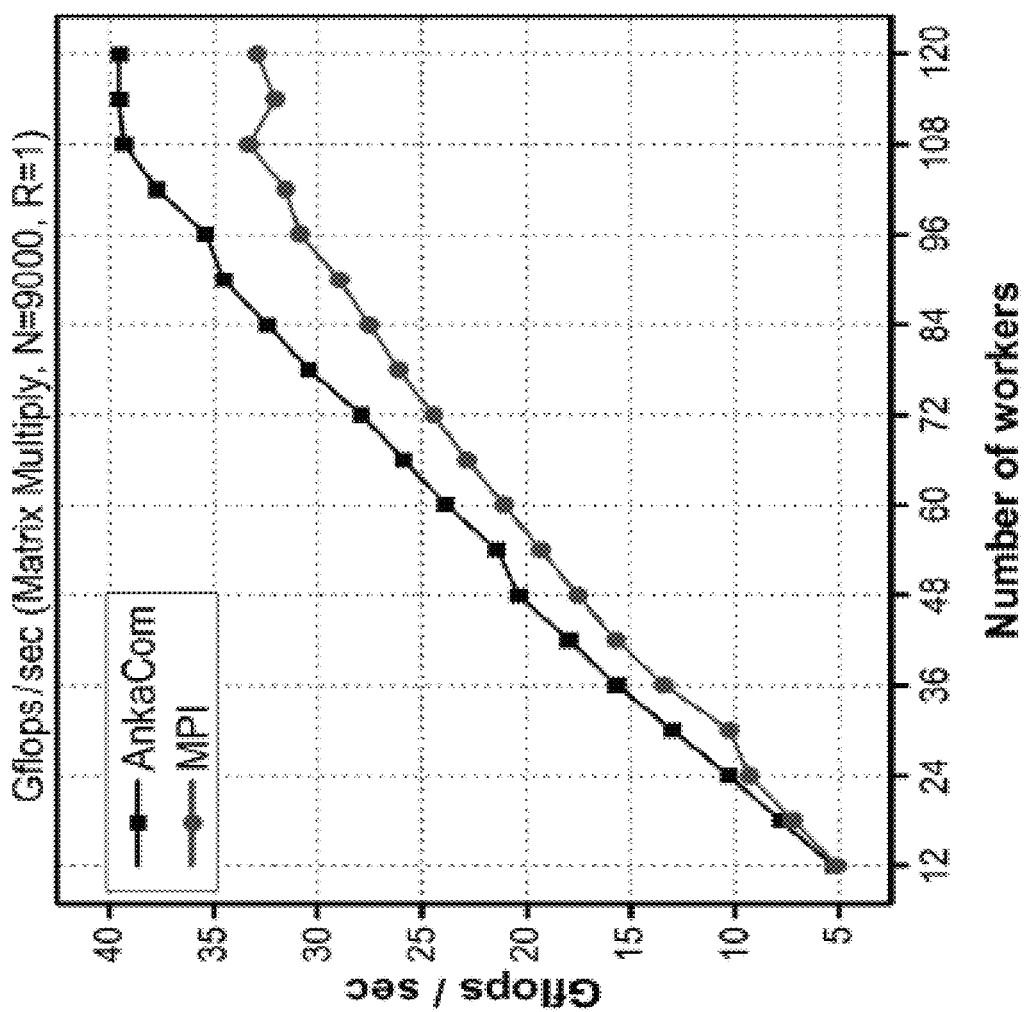
FIG. 12 is a graph of multi-node, multi-core performance of the Synergy and AnkaCom architectures as the number of workers increases.

FIG. 12 demonstrates results of a multi-core, multi-node test and compares the results of the AnkaCom distributed tuple space architecture with a multi-core, multi-node test of MPI 1.4.4 on RedHat Linux 6.5. The test performed was a matrix multiply with N=9000. The AnkaCom implementation was run with R=1, where R is a measurement of the redundancy in the tuple space. An R of 0 means that each tuple is only stored on one host. In the experiment of FIG. 12, R=1 means that each tuple is replicated with one copy elsewhere. The graph illustrates the total computing power measured in GFLOPS of a distributed architecture graphed against the number of workers in the system. One would expect that in an ideal parallel computing system, performance would increase linearly with the number of workers concurrently working on the problem. As shown in the graph, this was not the case. The graph in FIG. 12 demonstrates consistently better AnkaCom performance until the inflection point where communication overhead becomes overwhelming. The same effect was also demonstrated for the bare metal MPI program at a much earlier time. The SMC (AnkaCom) program is optimized using the best performing granularities for each node configuration. The MPI performances are the best performances after three consecutive runs.

FIG. 13 demonstrates data replication performance results in a UVR storage system. The figures demonstrate that regardless the degree of replication (R=2, 3, 4), the client observable elapsed times suffer very little. Described another way, when the program and data are completely decoupled, sufficient resources can hide commonly feared replication overheads. Data replication time can therefore be invisible to the end user as long as there are enough networking and storage resources. Overhead will only affect performance when the resources are saturated, and this can be mitigated by adding more resources.

FIG. 14 demonstrates the read and write performance comparisons against the Hadoop File System (HDFS), in reading and writing of large data files. As shown, the UVR storage system demonstrates consistently better results than HDFS.

Figure 15:
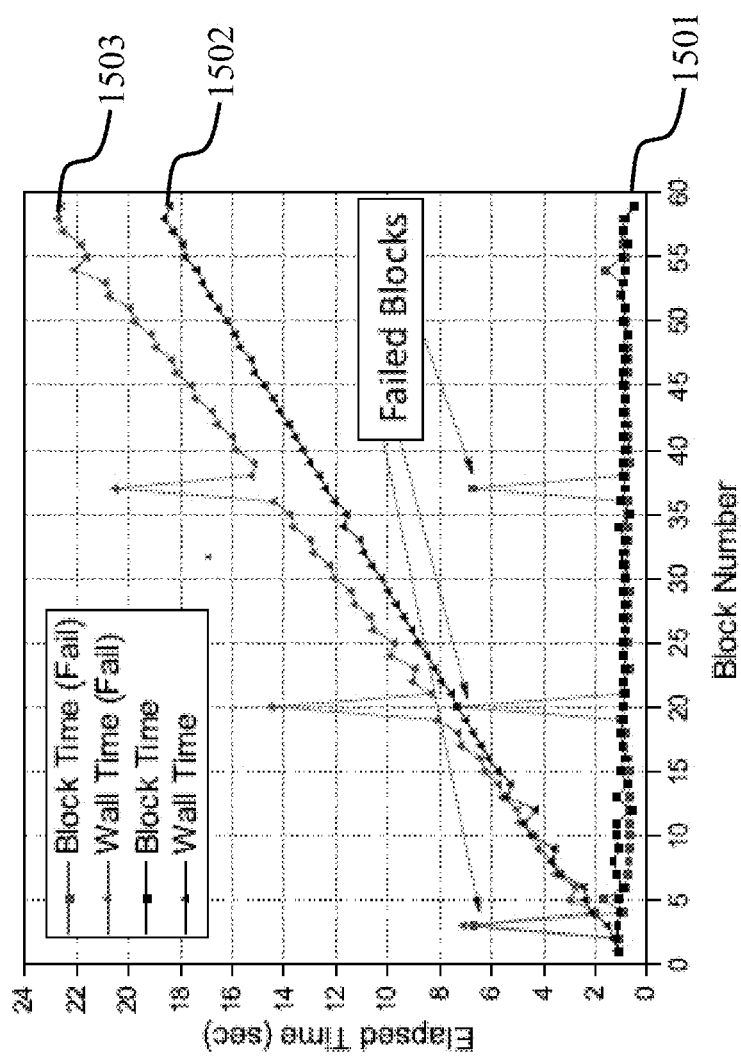
FIG. 15 is a graph showing performance of a storage system compensating for node failures.

FIG. 15 demonstrates the results of service reliability experiments for AnkaStore. The experiments demonstrated zero data loss with degraded performances during multiple simulated random node failures. The traces show the elapsed time in seconds for each block individually 1501, the overall elapsed time with no failures 1502, and the overall elapsed time with three namenode failures 1503. As shown, Anka-Store performance suffers briefly when a node crashes, but the system is capable of recovering from the failure and delivering the best possible performance using the remaining resources.

Thus, the present invention significantly outperforms and overcomes the difficulties of existing systems implemented using direct OSI Standard protocols. In the present system, not only is inter-process communication more efficient than the existing art in the field, but it is also provably more reliable. Further, by complete program, data, processor, network, and storage decoupling, the present invention makes it possible to eliminate all single-point failures. This provides massive efficiency and reliability gains as computing services increase in size and scope.

There are many other applications for mission-critical non-stop network-scale computing services. These include Smart Grid controllers, Software Defined Network controllers, medical information storage and exchanges, digital currency storage and processing services.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A network-scale parallel computing system, comprising:
    a client node; and
    a Unidirectional Virtual Ring (UVR) content addressable service network, comprising:
        a plurality of distributed Statistic Multiplexed Computing nodes having a collective set of resources, and implementing a Tuple Space abstraction;
        a plurality of redundant networks, wherein each of the plurality of distributed Statistic Multiplexed Computing nodes is communicatively connected to at least two of the plurality of redundant networks; and a set of instructions stored on a non-transitory computer readable medium, that when executed by a processor, implement a global virtual Tuple Space using the collective set of resources of all of the plurality of distributed Statistic Multiplexed Computing nodes;

wherein the client node is connected to the UVR content addressable service network via a plurality of redundant network connections; and wherein the UVR content addressable service network is configured to completely decouple programs and data from processors, storage, and communication hardware;

wherein the client node is configured to send single-sided communication messages to the plurality of distributed Statistic Multiplexed Computing nodes, each single-sided communication message comprising a computing task to be completed within an expected completion time; and wherein the client node comprises a timeout retransmission protocol configured to send a retransmission of a first single-sided communication message when a response indicating completion of the computing task is not received within the expected completion time of the computing task, with the retransmission sent via a different network path than the first single-sided communication message, and to continue sending the retransmission until the response indicating the completion of the computing task is received.

2. The computing system of claim 1, wherein a partial failure in any processor, network and storage does not irreparably interrupt execution of the set of instructions.

3. The computing system of claim 1, wherein the client node implements a retransmission and redundancy elimination protocol upon a timeout event on a task executing on a first node, the retransmission and redundancy elimination protocol configured to execute from different processors, networks and storage from the first node.

4. The computing system of claim 1, wherein each of the plurality of distributed Statistic Multiplexed Computing nodes comprises a data and transaction replication gateway, configured to ensure parallel synchronous replication on multiple nodes and non-stop data resynchronization for storage or database recovery.

* * * * *

UNITED STATES PATENT AND TRADEMARK OFFICE
CERTIFICATE OF CORRECTION

| | | |
|---|---|---|
| PATENT NO. | : 11,588,926 B2 | |
| APPLICATION NO. | : 16/348899 | |
| DATED | : February 21, 2023 | |
| INVENTOR(S) | : Justin Yuan Shi | |

It is certified that error appears in the above-identified patent and that said Letters Patent is hereby corrected as shown below:

In the Specification

On Column 1, Line 15, please replace the paragraph titled "STATEMENT REGARDING FEDERALLY SPONSORED RESEARCH OR DEVELOPMENT" with the following paragraph:
--STATEMENT REGARDING FEDERALLY SPONSORED RESEARCH OR DEVELOPMENT
This invention was made with government support under IIP1507451, and CNS0958854 awarded by the National Science Foundation. The government has certain rights in the invention.--

Signed and Sealed this
Fifth Day of March, 2024

*Katherine Kelly Vidal*

Katherine Kelly Vidal
*Director of the United States Patent and Trademark Office*